US012190895B2

(12) United States Patent
Kjoerling et al.

(10) Patent No.: US 12,190,895 B2
(45) Date of Patent: *Jan. 7, 2025

(54) METHODS AND DEVICES FOR JOINT MULTICHANNEL CODING

(71) Applicant: DOLBY INTERNATIONAL AB, Dublin (IE)

(72) Inventors: Kristofer Kjoerling, Solna (SE); Harald Mundt, Fürth (DE); Heiko Purnhagen, Sundyberg (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,907

(22) Filed: Sep. 1, 2023

(65) Prior Publication Data

US 2024/0062765 A1 Feb. 22, 2024

Related U.S. Application Data

(60) Continuation of application No. 17/854,947, filed on Jun. 30, 2022, now Pat. No. 11,749,288, which is a continuation of application No. 16/673,042, filed on Nov. 4, 2019, now Pat. No. 11,380,336, which is a division of application No. 16/115,354, filed on Aug.

(Continued)

(51) Int. Cl.
*G10L 19/008* (2013.01)

(52) U.S. Cl.
CPC .................................. *G10L 19/008* (2013.01)

(58) Field of Classification Search
CPC .................................................... G10L 19/008
See application file for complete search history.

(56) References Cited

U.S. PATENT DOCUMENTS

| | | | |
|---|---|---|---|
| 6,275,589 | B1 | 8/2001 | Spille |
| 8,126,152 | B2 | 2/2012 | Taleb |

(Continued)

FOREIGN PATENT DOCUMENTS

| | | | |
|---|---|---|---|
| AU | 2013206557 B2 | 11/2015 | |
| CN | 1669359 A | 9/2005 | |

(Continued)

OTHER PUBLICATIONS

Hotho, G et al."A Backward-Compatible Multichannel Audio Codec" IEEE Transactions on Audio, Speech, and Language Processing, vol. 16, Issue 1, pp. 83-93, Jan. 2008.

(Continued)

*Primary Examiner* — Sonia L Gay

(57) ABSTRACT

Encoding and decoding devices for encoding the channels of an audio system having at least four channels are disclosed. The decoding device has a first stereo decoding component which subjects a first pair of input channels to a first stereo decoding, and a second stereo decoding component which subjects a second pair of input channels to a second stereo decoding. The results of the first and second stereo decoding components are crosswise coupled to a third and a fourth stereo decoding component which each performs stereo decoding on one channel resulting from the first stereo decoding component, and one channel resulting from the second stereo decoding component.

3 Claims, 8 Drawing Sheets

Related U.S. Application Data 28, 2018, now Pat. No. 10,497,377, which is a division of application No. 15/647,076, filed on Jul. 11, 2017, now Pat. No. 10,083,701, which is a continuation of application No. 14/916,415, filed as application No. PCT/EP2014/069043 on Sep. 8, 2014, now Pat. No. 9,761,231.

(60) Provisional application No. 61/877,189, filed on Sep. 12, 2013.

(56) References Cited

U.S. PATENT DOCUMENTS

| | | | |
|---|---|---|---|
| 8,218,775 | B2 | 7/2012 | Norvell et al. |
| 8,270,618 | B2 | 9/2012 | Herre |
| 8,386,269 | B2 | 2/2013 | Thumpudi |
| 8,488,797 | B2 | 7/2013 | Oh |
| 2005/0074127 | A1 | 4/2005 | Herre et al. |
| 2007/0071247 | A1 | 3/2007 | Pang et al. |
| 2007/0121954 | A1 | 5/2007 | Kim et al. |
| 2007/0165869 | A1* | 7/2007 | Ojanpera .............. G10L 19/008 381/23 |
| 2007/0189426 | A1 | 8/2007 | Kim |
| 2007/0280485 | A1 | 12/2007 | Villemoes |
| 2008/0037809 | A1 | 2/2008 | Kim |
| 2009/0110203 | A1 | 4/2009 | Taleb |
| 2009/0210234 | A1 | 8/2009 | Sung |
| 2010/0027625 | A1 | 2/2010 | Wik |
| 2011/0013790 | A1 | 1/2011 | Hilpert et al. |
| 2011/0022402 | A1 | 1/2011 | Engdegard et al. |
| 2011/0091045 | A1 | 4/2011 | Schuijers |
| 2011/0106543 | A1 | 5/2011 | Jaillet |
| 2011/0261966 | A1 | 10/2011 | Engdegard |
| 2012/0213377 | A1 | 8/2012 | Henn |
| 2013/0066639 | A1 | 3/2013 | Lee et al. |
| 2013/0138446 | A1 | 5/2013 | Hellmuth |

FOREIGN PATENT DOCUMENTS

| | | | |
|---|---|---|---|
| CN | 1998046 | B1 | 7/2007 |
| CN | 101366321 | A | 2/2009 |
| CN | 101390443 | B | 3/2009 |
| CN | 101529501 | B | 9/2009 |
| CN | 101582259 | B | 11/2009 |
| CN | 101036183 | B | 6/2011 |
| CN | 101248483 | B | 11/2011 |
| CN | 101816040 | B | 12/2011 |
| CN | 101371447 | B | 6/2012 |
| CN | 102577384 | B | 7/2012 |
| CN | 102598717 | B | 7/2012 |
| CN | 101133680 | B | 8/2012 |
| CN | 103052983 | B | 4/2013 |
| EP | 1285436 | B1 | 2/2003 |
| EP | 1410687 | B1 | 9/2005 |
| EP | 1523862 | B1 | 10/2007 |
| EP | 2437257 | B1 | 4/2012 |
| EP | 2535892 | B1 | 12/2012 |
| JP | 2002-526798 | A | 8/2002 |
| JP | 2005-533426 | A | 11/2005 |
| RU | 2327304 | B1 | 6/2008 |
| TW | 201301265 | A | 1/2013 |
| WO | 2005/083679 | A1 | 9/2005 |
| WO | 2007/007623 | A2 | 1/2007 |
| WO | 2007/058510 | A1 | 5/2007 |
| WO | 2011/072729 | A1 | 6/2011 |
| WO | 2011/107951 | A1 | 9/2011 |
| WO | 2012/025429 | A1 | 3/2012 |
| WO | 2012/052676 | A1 | 4/2012 |
| WO | 2012/126866 | A1 | 9/2012 |

OTHER PUBLICATIONS

ISO/IEC FDIS 23003-3:2011 (E), Information Technology—MPEG Audio Technologies—Part 3: Unified Speech and Audio Coding, ISO/IEC JTC 1/SC 29/WG 11, Sep. 20, 2011.

Kruger, H. et al "A New Approach for Low-Delay Joint-Stereo Coding" ITG Conference on Voice Communication, pp. 1-4, Oct. 8, 2008.

* cited by examiner

METHODS AND DEVICES FOR JOINT MULTICHANNEL CODING

CROSS REFERENCE TO RELATED APPLICATIONS

This application is a continuation of U.S. patent application Ser. No. 17/854,947, filed Jun. 30, 2022, now U.S. Pat. No. 11,749,288, issued on Sep. 5, 2023, which is a continuation of U.S. patent application Ser. No. 16/673,042, filed Nov. 4, 2019, now U.S. Pat. No. 11,380,336, issued Jul. 5, 2022, which is a divisional of U.S. patent application Ser. No. 16/115,354, filed Aug. 28, 2018, now U.S. Pat. No. 10,497,377, issued on Dec. 3, 2019, which is a divisional of U.S. patent application Ser. No. 15/647,076, filed Jul. 11, 2017, now U.S. Pat. No. 10,083,701 issued on Sep. 25, 2018, which is a continuation of U.S. patent application Ser. No. 14/916,415, filed Mar. 3, 2016, now U.S. Pat. No. 9,761,231, issued on Sep. 12, 2017, which is U.S. National Application of International Application No. PCT/EP2014/069043, filed Sep. 8, 2014, which claims the benefit of U.S. Provisional Application No. 61/877,189, filed Sep. 12, 2013, each of which is hereby incorporated by reference in its entirety.

TECHNICAL FIELD

The invention disclosed herein generally relates to audio encoding and decoding. In particular, it relates to an audio encoder and an audio decoder adapted to encode and decode the channels of a multichannel audio system by performing a plurality of stereo conversions.

BACKGROUND

There are prior art techniques for encoding the channels of a multichannel audio system. An example of a multichannel audio system is a 5.1 channel system comprising a center channel (C), a left front channel (Lf), a right front channel (Rf), a left surround channel (Ls), a right surround channel (Rs), and a low frequency effects (Lfe) channel. An existing approach of coding such a system is to code the center channel C separately, and performing joint stereo coding of the front channels Lf and Rf, and joint stereo coding of the surround channels Ls and Rs. The Lfe channel is also coded separately and will in the following always be assumed to be coded separately.

The existing approach has several drawbacks. For example, consider a situation when the Lf and the Ls channel comprise a similar audio signal of similar volume. Such an audio signal will sound as if comes from a virtual sound source being located between the Lf and the Ls speaker. However, the above described approach is not able to efficiently code such an audio signal since it prescribes that the Lf channel is to be coded with the Rf channel, instead of performing a joint coding of the Lf and the Ls channel. Thus the similarities between the audio signals of the Lf and Ls speaker cannot be exploited in order to achieve an efficient coding.

There is thus a need for an encoding/decoding framework which has an increased flexibility when it comes to coding of multichannel systems.

BRIEF DESCRIPTION OF THE DRAWINGS

In what follows, example embodiments will be described in greater detail and with reference to the accompanying drawings, on which.

DETAILED DESCRIPTION

Figure 1A:
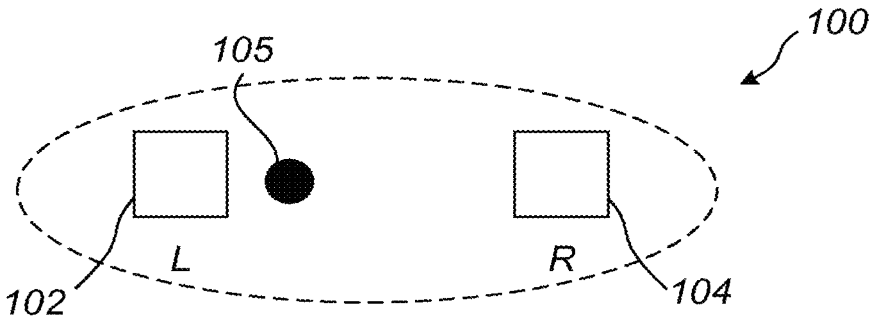
FIG. 1*a* illustrates an exemplary two-channel setup.

In view of the above it is an object to provide an encoding device and a decoding device and associated methods which provide a flexible and efficient coding of the channels of a multichannel audio system.

I. Overview—Encoder

According to a first aspect, there is provided an encoding method, an encoding device, and a computer program product in a multichannel audio system.

According to exemplary embodiments, there is provided an encoding method in a multichannel audio system comprising at least four channels, comprising: receiving a first pair of input channels and a second pair of input channels; subjecting the first pair of input channels to a first stereo encoding; subjecting the second pair of input channels to a second stereo encoding; subjecting a first channel resulting from the first stereo encoding and an audio channel associated with a first channel resulting from the second stereo encoding to a third stereo encoding so as to obtain a first pair of output channels; subjecting a second channel resulting from the first stereo encoding and a second channel of resulting from the second stereo encoding to a fourth stereo encoding so as to obtain a second pair of output channels; and output of the first and the second pair of output channels.

The first pair and the second pair of input channels correspond to channels to be encoded. The first pair and the second pair of output channels correspond to encoded channels.

Consider an exemplary audio system comprising a Lf channel, a Rf channel, a Ls channel, and a Rs channel. If the Lf channel and the Ls channel are associated with the first pair of input channels, and the Rf channel and the Rs channel are associated with the second pair of input channels, the above exemplary embodiment would imply that first the Lf and Ls channels are jointly coded, and the Rf and Rs channels are jointly coded. In other words, the channels are first coded in a front-back direction. The result of the first (front-back) coding is then again coded meaning that a coding is applied in the left-right direction.

Another option is to associate the Lf channel and the Rf channel with the first pair of input channels, and the Ls channel and the Rs channel with the second pair of input channels. Such mapping of the channels would imply that first a coding in the left-right direction is performed followed by a coding in the front-back direction.

In other words the above encoding method allows for an increased flexibility for how to jointly code the channels of a multichannel system.

According to exemplary embodiments, the audio channel associated with the first channel resulting from the second stereo encoding is the first channel resulting from the second stereo encoding. Such an embodiment is efficient when performing coding for a four-channel setup.

According to other exemplary embodiments the second channel resulting from the first stereo encoding is further coded prior to being subject to the fourth stereo encoding. For example, the encoding method may further comprise: receiving a fifth input channel; subjecting the fifth input channel and the first channel resulting from the second stereo encoding to a fifth stereo encoding; wherein the audio channel associated with the first channel resulting from the second stereo encoding is a first channel resulting from the fifth stereo encoding; and wherein a second channel resulting from the fifth stereo encoding is output as a fifth output channel.

In this way the fifth input channel is thus jointly coded with the second channel resulting from the first stereo encoding. For example, the fifth input channel may correspond to the center channel and the second channel resulting from the first stereo encoding may correspond to a joint coding of the Rf and Rs channels or a joint coding of the Lf and Ls channels. In other words, according to examples, the center channel C may be jointly coded with respect to the left side or the right side of the channel setup.

The exemplary embodiments disclosed above relate to audio systems comprising four or five channels. However, the principles disclosed herein may be extended to six channels, seven channels etc. In particular, an additional pair of input channels may be added to a four channel setup to arrive at a six channel setup. Similarly, an additional pair of input channels may be added to a five channel setup to arrive at a seven channel setup, etc.

In particular, according to exemplary embodiments the encoding method may further comprise: receiving a third pair of input channels; subjecting a second channel of the first pair of input channels and a first channel of the third pair of input channels to a sixth stereo encoding; subjecting a second channel of the second pair of input channels and a second channel of the third pair of input channels to a seventh stereo encoding; wherein a first channel resulting from the sixth stereo encoding and a first channel of the first pair of input channels are subjected to the first stereo encoding;

wherein a first channel resulting from the seventh stereo encoding and a first channel of the second pair of input channels are subjected to the second stereo encoding; and subjecting a second channel resulting from the sixth stereo encoding and a second channel resulting from the seventh stereo encoding to an eight stereo encoding so as to obtain a third pair of output channels.

The above provides a flexible approach of adding additional channel pairs to a channel setup.

According to exemplary embodiments, the first, second, third, and fourth stereo encoding and the fifth, sixth, seventh, and eighth stereo encoding when applicable, comprises performing stereo encoding according to a coding scheme including left-right coding (LR-coding), sum-difference coding (or mid-side coding, MS-coding), and enhanced sum-difference coding (or enhanced mid-side coding, enhanced MS-coding).

This is advantageous in that it further adds to the flexibility of the system. More particularly, by choosing different types of coding schemes the coding may be adapted to optimize the coding for the audio signals at hand.

The different coding schemes will be described in more detail below. However, in brief, left-right coding means that the input signals are passed through (the output signals equal the input signals). Sum-difference coding means that one of the output signals is a sum of the input signals, and the other output signal is a difference of the input signals. Enhanced MS-coding means that one of the output signals is a weighted sum of the input signals and the other output signal is a weighted difference of the input signals.

The first, second, third, and fourth stereo encoding and the fifth, sixth, seventh, and eighth stereo encoding when applicable, may all apply the same stereo coding scheme. However, the first, second, third, and fourth stereo encoding and the fifth, sixth, seventh, and eighth stereo encoding when applicable, may also apply different stereo coding schemes.

According to exemplary embodiments, different coding schemes may be used for different frequency bands. In this way, the coding may be optimized with respect to the audio content in different frequency bands. For example, a more refined coding (in terms of the number of bits spent in the coding) may be applied at low frequency bands to which the ear is most sensitive.

According to exemplary embodiments, different coding schemes may be used for different time frames. Thus, the coding may be adapted and optimized with respect to the audio content in different time frames.

The first, the second, the third, the fourth, and the fifth, sixth, seventh and eighth stereo encoding, if applicable, are performed in a critically sampled modified discrete cosine transform, MDCT, domain. By critically sampled is meant that the number of samples of the coded signals equals the number of samples of the original signals.

The MDCT transforms a signal from the time domain to the MDCT domain based on a window sequence. Apart from some exceptional cases, the input channels are transformed to the MDCT domain using the same window, both with respect to window size and transform length. This enables the stereo coding to apply mid-side and enhanced MS-coding of the signals.

Exemplary embodiments also relate to a computer program product comprising a computer-readable medium with instructions for performing any of the encoding methods disclosed above. The computer-readable medium may be a non-transitory computer-readable medium.

According to exemplary embodiments, there is provided an encoding device in a multichannel audio system comprising at least four channels, comprising: a receiving component configured to receive a first pair of input channels and a second pair of input channels; a first stereo encoding component configured to subject the first pair of input channels to a first stereo encoding;

a second stereo encoding component configured to subject the second pair of input channels to a second stereo encoding; a third stereo encoding component configured to subject a first channel resulting from the first stereo encoding and an audio channel associated with a first channel resulting from the second stereo encoding to a third stereo encoding so as to provide a first pair of output channels; a fourth stereo encoding component configured to subject a second channel resulting from the first stereo encoding and a second channel resulting from the second stereo encoding to a fourth stereo encoding so as to obtain a second pair of output channels; and an output component configured to output the first and the second pair of output channels.

Exemplary embodiments also provide an audio system comprising an encoding device in accordance with the above.

II. Overview—Decoder

According to a second aspect, there are provided a decoding method, a decoding device, and a computer program product in a multichannel audio system.

The second aspect may generally have the same features and advantages as the first aspect.

According to exemplary embodiments there is provided a decoding method in a multichannel audio system comprising at least four channels, comprising: receiving a first pair of input channels and a second pair of input channels; subjecting the first pair of input channels to a first stereo decoding; subjecting the second pair of input channels to a second stereo decoding; subjecting a first channel resulting from the first stereo decoding and a first channel resulting from the second stereo decoding to a third stereo decoding so as to obtain a first pair of output channels; subjecting an audio channel associated with a second channel resulting from the first stereo decoding and a second channel resulting from the second stereo decoding to a fourth stereo decoding so as to obtain a second pair of output channels; and output of the first and the second pair of output channels.

The first and the second pair of input channels correspond to encoded channels which are to be decoded. The first and the second pair of output channels correspond to decoded channels.

According to exemplary embodiments, the audio channel associated with the second channel resulting from the first stereo decoding may be equal the second channel resulting from the first stereo decoding.

For example, the method may further comprise receiving a fifth input channel; subjecting the fifth input channel and the second channel resulting from the first stereo decoding to a fifth stereo decoding; wherein the audio channel associated with the second channel resulting from the first stereo decoding equals a first channel resulting from the fifth stereo decoding; and wherein a second channel resulting from the fifth stereo decoding is output as a fifth output channel.

The decoding method may further comprise: receiving a third pair of input channels; subjecting the third pair or input channels to a sixth stereo decoding; subjecting a second channel of the first pair of output channels and a first channel resulting from the sixth stereo decoding to a seventh stereo decoding; subjecting a second channel of the second pair of output channels and a second channel resulting from the sixth decoding to an eighth stereo decoding; and output of the first channel of the first pair of output channels, the pair of channels resulting from the seventh stereo decoding, the first channel of the second pair of output channels and the pair of channels resulting from the eighth stereo decoding.

According to exemplary embodiments, the first, second, third, and fourth stereo decoding and the fifth, sixth, seventh, and eighth stereo decoding when applicable, comprises performing stereo decoding according to a coding scheme including left-right coding, sum-difference coding, and enhanced sum-difference coding.

Different coding schemes are used for different frequency bands. Different coding schemes may be used for different time frames.

The first, the second, the third, the fourth, and the fifth, sixth, seventh, and eighth stereo decoding, if applicable, are preferably performed in a critically sampled modified discrete cosine transform, MDCT, domain. Preferably, all input channels are transformed to the MDCT domain using the same window, both with respect to the window shape and the transform length.

The second pair of input channels may have a spectral content corresponding to frequency bands up to a first frequency threshold, whereby the pair of channels resulting from the second stereo decoding is equal to zero for frequency bands above the first frequency threshold. For example, the spectral content of the second pair of input channels may have be set to zero at the encoder side in order to decrease the amount of data to be transmitted to the decoder.

In a case that the second pair of input channels only has a spectral content corresponding to frequency bands up to a first frequency threshold and the first pair of input channels has a spectral content corresponding to frequency bands up to a second frequency threshold which is larger than the first frequency threshold, the method may further apply parametric upmixing techniques for frequencies above the first frequency to compensate for the frequency limitation of the second pair of input channels. In particular, the method may comprise: representing the first pair of output channels as a first sum signal and a first difference signal, and representing the second pair of output channels as a second sum signal and a second difference signal; extending the first sum signal and the second sum signal to a frequency range above the second frequency threshold by performing high frequency reconstruction; mixing the first sum signal and the first difference signal, wherein for frequencies below the first frequency threshold the mixing comprises performing an inverse sum-and-difference transformation of the first sum and the first difference signal, and for frequencies above the first frequency threshold the mixing comprises performing parametric upmixing of the portion of the first sum signal corresponding to frequency bands above the first frequency threshold; and mixing the second sum signal and the second difference signal, wherein for frequencies below the first frequency threshold the mixing comprises performing an inverse sum-and-difference transformation of the second sum and the second difference signal, and for frequencies above the first frequency threshold the mixing comprises performing parametric upmixing of the portion of the second sum signal corresponding to frequency bands above the first frequency threshold.

The steps of extending the first sum signal and the second sum signal to a frequency range above the second frequency threshold, mixing the first sum signal and the first difference signal, and mixing the second sum signal and the second difference signal are preferably performed in a quadrature mirror filter, QMF, domain. This is in contrast to the first, second, third, and fourth stereo decoding which is typically carried out in an MDCT domain.

According to exemplary embodiments, there is provided a computer program product comprising a computer-readable medium with instructions for performing the method of any of the preceding claims. The computer-readable medium may be a non-transitory computer-readable medium.

According to exemplary embodiments, there is provided a decoding device in a multichannel audio system comprising at least four channels, comprising: a receiving component configured to receive a first pair of input channels and a second pair of input channels; a first stereo decoding component configured to subject the first pair of input channels to a first stereo decoding; a second stereo decoding component configured to subject the second pair of input channels to a second stereo decoding; a third stereo decoding component configured to subject a first channel resulting from the first stereo decoding and a first channel resulting from the second stereo decoding to a third stereo decoding so as to obtain a first pair of output channels; a fourth stereo decoding component configured to subject an audio channel associated with the second channel resulting from the first stereo decoding and a second channel resulting from the second stereo decoding to a fourth stereo decoding so as to obtain a second pair of output channels; and an output component configured to output the first and the second pair of output channels.

According to exemplary embodiments, there is provided an audio system comprising a decoding device according to the above.

III. Overview—Signaling format

According to a third aspect, there is provided a signaling format for indicating to a decoder by an encoder a coding configuration to use when decoding a signal representing the audio content of a multi-channel audio system, the multi-channel audio system comprising at least four channels, wherein said at least four channels are dividable into different groups according to a plurality of configurations, each group corresponding to channels that are jointly encoded, the signaling format comprising at least two bits indicating one of the plurality of configurations to be applied by the decoder.

This is advantageous in that it provides an efficient way of signaling to the decoder of which coding configuration, among a plurality of possible coding configurations, to use when decoding.

The coding configurations may be associated with an identification number. For this reason, the at least two bits indicate one of the plurality of configurations by indicating an identification number of said one of the plurality of configurations.

According to exemplary embodiments, the multi-channel audio system comprises five channels and the coding configurations correspond to: joint coding of five channels; joint coding of four channels and separate coding of a last channel; joint coding of three channels and separate joint coding of two other channels; and joint coding of two channels, separate joint coding of two other channels, and separate coding of a last channel.

In a case the at least two bits indicate joint coding of two channels, separate joint coding of two other channels, and separate coding of a last channel, the at least two bits may further include a bit indicating which two channels to be jointly coded and which two other channels to be jointly coded.

IV. Example Embodiments

FIG. 1*a* illustrates a channel setup 100 of an audio system comprising a first channel 102, which in this case corresponds to a left speaker L, and a second channel 104, which in this case corresponds to a right speaker R. The first 102 and the second 104 channel may be subject to joint stereo encoding and decoding.

Figure 1B:
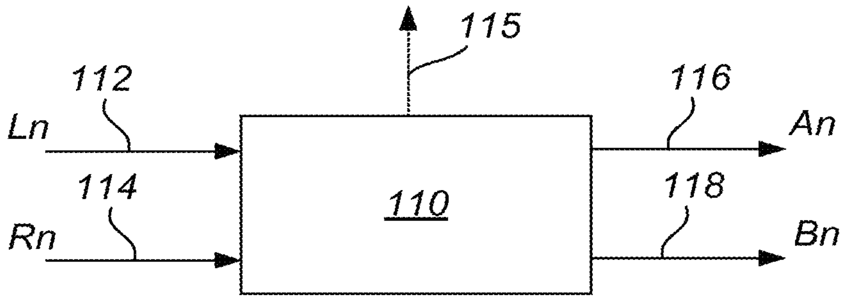
FIGS. 1*b* and 1*c* illustrate stereo encoding and decoding components according to an example.

FIG. 1*b* illustrates a stereo encoding component 110 which may be used to perform joint stereo encoding of the first channel 102 and the second channel 104 of FIG. 1*a*. Generally, the stereo encoding component 110 converts a first channel 112 (such as the first channel 102 of FIG. 1*a*), here denoted by Ln, and a second channel 114 (such as the second channel 104 of FIG. 1*a*), here denoted by Rn, into a first output channel 116, here denoted by An, and a second output channel 118, here denoted by Bn. During the encoding process, the stereo encoding component 110 may extract side information 115, including a parameter, to be discussed in more detail below. The parameter might be different for different frequency bands.

The encoding component 110 quantizes the first output channel 116, the second output channel 118, and the side information 115 and codes it in the form of a bit stream which is sent to a corresponding decoder.

Figure 1C:
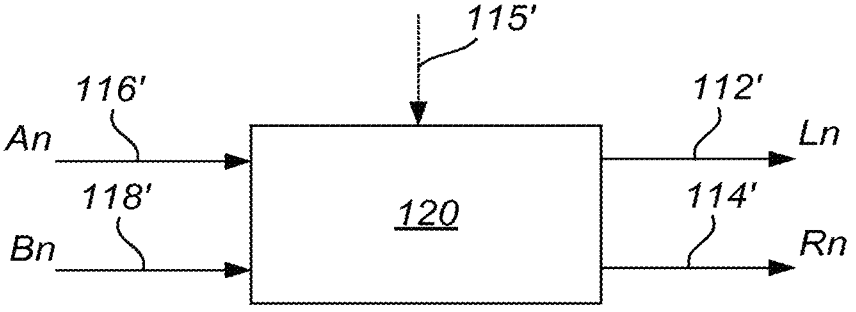

FIG. 1*c* illustrates a corresponding stereo decoding component 120. The stereo decoding component 120 receives a bit stream from the encoding device 110 and decodes and dequantizes a first channel 116' An (corresponding to the first output channel 116 at the encoder side), a second channel 118' Bn (corresponding to the second output channel 118 at the encoder side), and side information 115'. The stereo decoding component 120 outputs a first output channel 112' Ln and a second output channel 114' Rn. The stereo decoding component 120 may further take the side information 115' as input, which corresponds to the side information 115 that was extracted on the encoder side.

The stereo encoding/decoding components 110, 120 may apply different coding schemes. Which coding scheme to apply may be signalled to the decoding component 120 by the encoding component 110 in the side information 115. The encoding component 110 decides which of the three different coding schemes described below to use. This decision is signal adaptive and can hence vary over time from frame to frame. Furthermore. it can even vary between different frequency bands. The actual decision process in the encoder is quite complex, and typically takes the effects of quantization/coding in the MDCT domain as well as perceptual aspects and the cost of side information into account.

According to a first coding scheme referred to herein as left-right coding "LR-coding" the input and output channels of the stereo conversion components 110 and 120 are related according to the following expressions:

$$Ln=An;\ Rn=Bn.$$

In other words, LR-coding merely implies a pass-through of the input channels. Such coding may be useful if the input channels are very different.

According to a second coding scheme referred to herein as mid-side coding (or sum-and-difference coding) "MS-coding" the input and output channels of the stereo encoding/decoding components 110 and 120 are related according to the following expressions:

$$Ln=(An+Bn);Rn=(An-Bn).$$

From an encoder perspective the corresponding expressions are:

$$An=0.5(Ln+Rn);Bn=0.5(Ln-Rn).$$

In other words, MS-coding involves calculating a sum and a difference of the input channels. For this reason the channel An (the first output channel 116 on the encoder side, and the first input channel 116' on the decoder side) may be seen as a mid-signal (a sum-signal) of the first and a second channels Ln and Rn, and the channel Bn may be seen as a side-signal (a difference-signal) of the first and second channels Ln and Rn. MS-coding may be useful if the input channels Ln and Rn are similar with respect to signal shape as well as volume, since then the side-signal Bn will be close to zero. In such a situation the sound source sounds as if it were located in the middle between the first channel 102 and the second channel 104 of FIG. 1*a*.

The mid-side coding scheme may be generalized into a third coding scheme referred to herein as "enhanced MS-coding" (or enhanced sum-difference coding). In enhanced MS-coding, the input and output channels of the stereo encoding/decoding components 110 and 120 are related according to the following expressions:

$$Ln=(1+\alpha)An+Bn;Rn=(1-\alpha)An-Bn,$$

where α is parameter which may form part of the side information 115, 115'. The equations above describe the process from a decoder point-of-view, i.e. going from An, Bn to Ln, Rn. Also in this case the signal An may be thought of as a mid-signal and the signal Bn as a modified side-signal. Notably, for α=0, the enhanced MS-coding scheme degenerates to the mid-side coding. Enhanced MS-coding may be useful to code signals that are similar but of different volume. For example, if the left channel 102 and the right channel 104 of FIG. 1*a* comprises the same signal but the volume is higher in the left channel 102, the sound source will sound as if it were located closer to the left side, as illustrated by item 105 in FIG. 1*a*. In such a situation, the mid-side coding would generate a non-zero side-signal. However, by selecting an appropriate value of a between zero and one, the modified side-signal Bn may be equal or close to zero. Similarly, values of α between zero and minus one correspond to cases where the volume in the right channel is higher.

According to the above, the stereo encoding/decoding components 110 and 120 may thus be configured to apply different stereo coding schemes. The stereo encoding/decoding components 110 and 120 may also apply different stereo coding schemes for different frequency bands. For example, a first stereo coding scheme may be applied for frequencies up to a first frequency and a second stereo coding scheme may be applied for frequency bands above the first frequency. Moreover, the parameter a can be frequency dependent.

The stereo encoding/decoding components 110 and 120 are configured to operate on signals in a critically sampled modified discrete cosine transform (MDCT) domain, which is an overlapping window sequence domain. By critically sampled is meant that the number of samples in the frequency domain signal equals the number of samples in the time domain signal. In case the stereo encoding/decoding components 110 and 120 are configured to apply the LR-coding scheme the input channels 112 and 114 may be coded using different windows. However, if the stereo encoding/decoding components 110 and 120 are configured to apply any of the MS-coding or the enhanced MS-coding, the input channels have to be coded using the same window with respect to window shape as well as transform length.

Figure 2A:
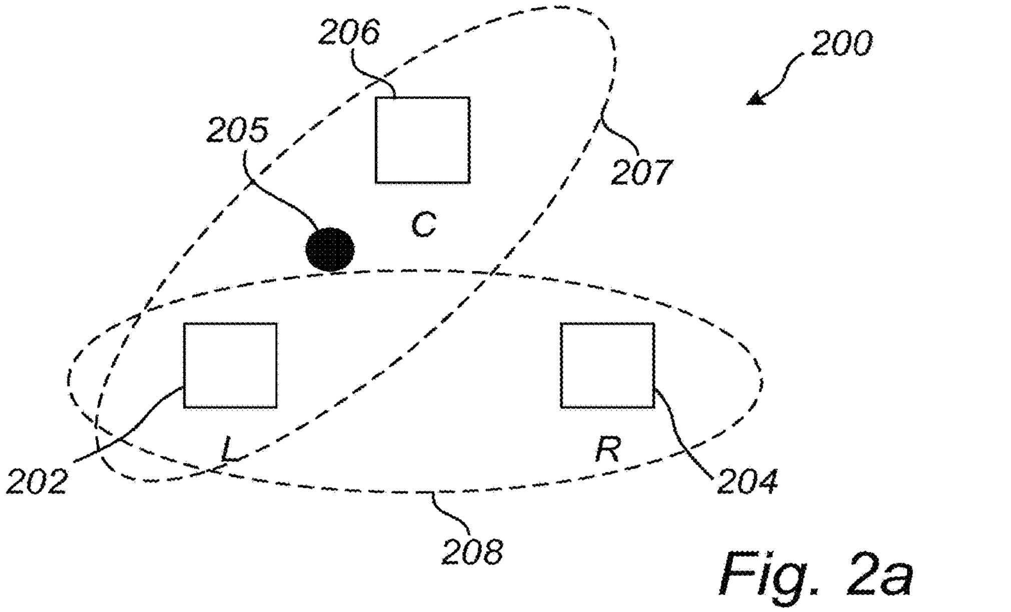
FIG. 2*a* illustrates an exemplary three-channel setup.

The stereo encoding/decoding components 110 and 120 may be used as building blocks in order to implement flexible coding/decoding schemes for audio systems comprising more than two channels. To illustrate the principles, a three-channel setup 200 of a multi-channel audio system is illustrated in FIG. 2*a*. The audio system comprises a first audio channel 202 (here a left channel L), a second audio channel 204 (here a right channel R), and a third channel 206 (here a center channel C).

Figure 2B:
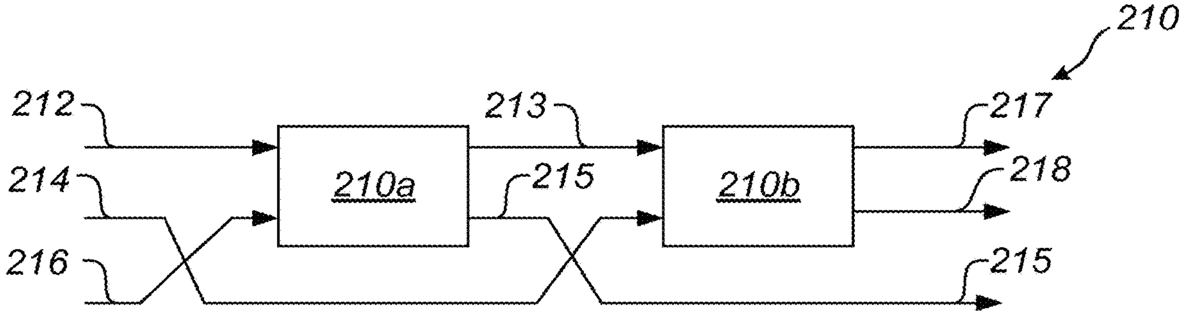
FIGS. 2*b* and 2*c* illustrate an encoding device and a decoding device, respectively, for a three-channel setup according to an example.

FIG. 2*b* illustrates an encoding device 210 for encoding the three channels 202, 204, and 206 of FIG. 2*a*. The encoding device 210 comprises a first stereo encoding component 210*a* and a second stereo encoding component 210*b* which are coupled in cascade.

The encoding device 210 receives a first input channel 212 (e.g. corresponding to the first channel 202 of FIG. 2*a*), a second input channel 214 (e.g. corresponding to the second channel 204 of FIG. 2*a*), and a third input channel 216 (e.g. corresponding to the third channel 206 of FIG. 2*a*). The first channel 212 and the third input channel 216 are input to the first stereo encoding component 210*a* which performs stereo encoding according to any of the stereo coding schemes described above. As a result, the first stereo encoding component 210*a* outputs a first intermediate output channel 213 and a second intermediate output channel 215. As used herein, an intermediate output channel refers to a result of a stereo encoding or stereo decoding. An intermediate output channel is typically not a physical signal in the sense that it necessarily is generated or can be measured in a practical implementation. Rather, the intermediate output channels are used herein to illustrate how the different stereo encoding or decoding components may be combined and/or arranged relative to each other. By intermediate is meant that the output channels 213 and 215 represent intermediate stages of the encoding device 210, as opposed to output channels which represent the encoded channels. For example, the first intermediate output channel 213 could be a mid-signal and the second intermediate output channel 215 could be a modified side-signal.

With reference to the example channel setup 200 of FIG. 1*a*, the processing carried out by the first stereo encoding component 210*a* could e.g. correspond to a joint stereo coding 207 of the left channel 202 and the center channel 206. In case of similar signals in the left channel 202 and the center channel 206 of different volumes, such joint stereo coding could be efficient to capture a virtual sound source 205 being located between the left channel 202 and the center channel 206.

The first intermediate output channel 213, and the second input channel 214 are then input to the second stereo encoding component 210*b* which performs stereo encoding according to any of the stereo coding schemes described above. The second stereo encoding component 210*b* outputs a first output channel 217 and a second output channel 218. With reference to the example channel setup of FIG. 1*a*, the processing carried out by the second stereo encoding component 210*b* could e.g. correspond to a joint stereo coding 208 of the right channel 204 and a mid-signal of the left channel 202 and the center channel 206 generated by the first stereo encoding component 210*a*.

The encoding device 210 outputs the first output channel 217, the second output channel 218 and the second intermediate channel 215 as a third output channel. For example the first output channel 217 may correspond to a mid-signal, and the second and third output channels 218 and 215, respectively, may correspond to modified side-signals.

The encoding device 210 quantizes and codes the output signals together with side information into a bit stream to be transmitted to a decoder.

Figure 2C:
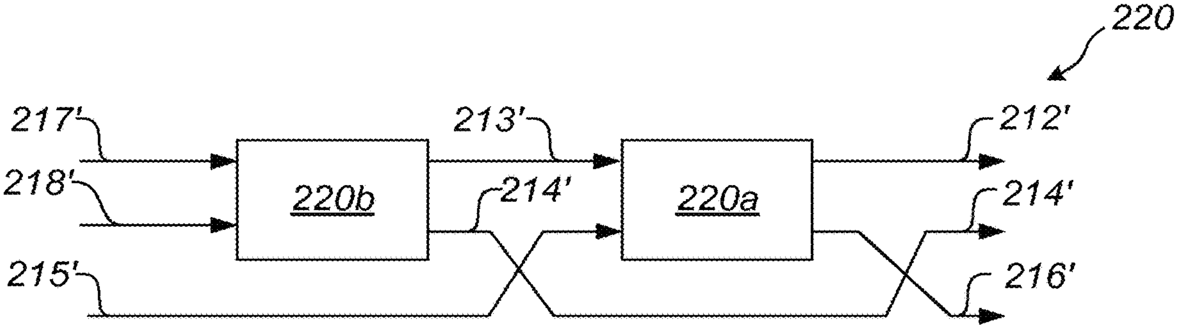

A corresponding decoding device 220 is illustrated in FIG. 2*c*. The decoding device 220 comprises a first stereo decoding component 220*b* and a second stereo decoding component 220*a*. The first stereo decoding component 220*b* in the decoding device 220 is configured to apply a coding scheme which is the inverse of the coding scheme of the second stereo encoding component 210*b* at the encoder side.

Likewise, the second stereo decoding component 220*a* in the decoding device 220 is configured to apply a coding scheme which is the inverse of the coding scheme of the first stereo encoding component 210*a* at the encoder side. The coding schemes to apply at the decoder side may be indicated by signaling in the bit stream which is sent from the encoding device 210 to the decoding device 220. This may e.g. include indicating which of LR-coding, MS-coding or enhanced MS-coding the stereo decoder components 220*b* and 220*a* should apply. There may further be one or more bits which indicate whether the center channel is to be coded together with the left channel or the right channel.

The decoding device 220 receives, decodes and dequantizes a bit stream which is transmitted from the encoding device 210. In this way, the decoding device 220 receives a first input channel 217' (corresponding to the first output channel of the encoding device 210), a second input channel 218' (corresponding to the second output channel of the encoding device 210), and a third input channel 215' (corresponding to the third output channel of the encoding device 210). The first and the second input channels 217' and 218' are input to the first stereo decoding component 220*b*. The first stereo decoding component 220*b* performs stereo decoding according to the inverse coding scheme that was applied in the second stereo encoding component 210*b* on the encoder side. As a result thereof, a first intermediate output channel 213' and a second intermediate output channel 214' are output of the first stereo decoding component 220*b*. Next the first intermediate output channel 213' and the third input channel 215' are input to the second stereo decoding component 220*a*. The second stereo decoding component 220*a* performs stereo decoding of its input signals according a coding scheme which is the inverse of coding scheme applied in the first stereo encoding component 210*a* on the encoder side. The second stereo decoding component 220*a* outputs a first output channel 212' (corresponding to the first input signal 212 on the encoder side), a second output channel 214' (corresponding to the second input signal 214 on the encoder side), and the second intermediate output channel 214' as a third output channel 216' (corresponding to the third input signal 216 on the encoder side).

In the examples given above, the first input channel 212 may correspond to the left channel 202, the second input channel 214 may correspond to the right channel 204, and the third input channel 216 may correspond to the center channel 206. However, it is to be noted that the first, second and third input channels 212, 214, 216, may correspond to the channels 202, 204, and 206 of FIG. 2*a* according to any permutation. In this way, the encoding and decoding devices 210, 220 provides a very flexible scheme for how to encode/decode the three channels 202, 204, and 206 of FIG. 2*a*. Moreover, the flexibility is even more increased in that the coding schemes of the stereo encoding components 210*a* and 210*b* may be selected in any way. For example, the stereo encoding components 210*a* and 210*b* may both apply the same coding scheme, such as enhanced MS-coding, or different coding schemes. Further, the coding schemes may vary depending on the frequency band to be coded and/or depending on the time frame to be coded. The coding scheme to apply may be signaled in the bit stream from the encoding device 210 to the decoding device 220 as side information.

Figure 3A:
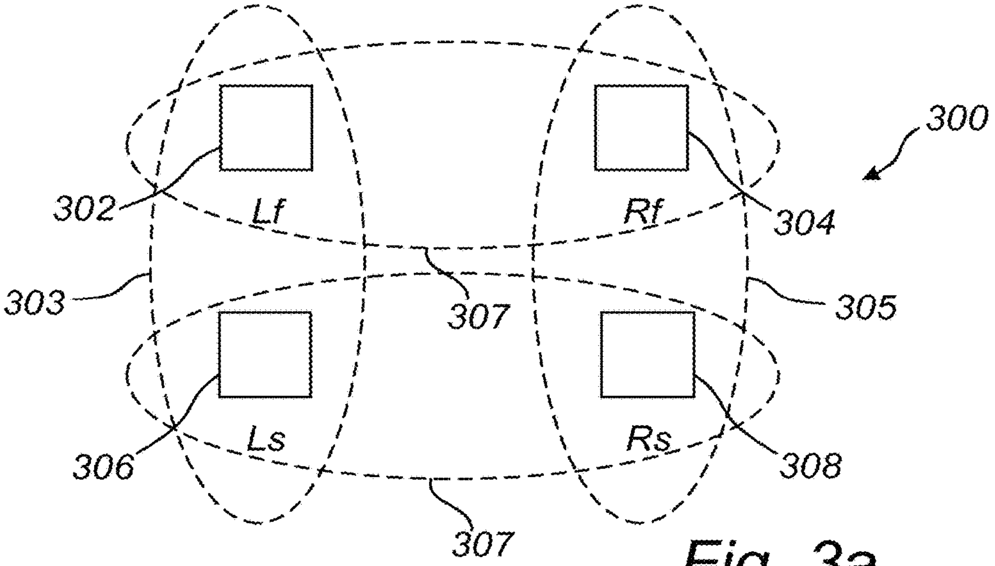
FIG. 3*a* illustrates an exemplary four-channel setup.

An exemplary embodiment will now be described with reference to FIGS. 3*a-c*. FIG. 3*a* illustrates a four-channel setup 300 of a multichannel audio system. The audio system comprises a first channel 302, here corresponding to a left front speaker Lf, a second channel 304, here corresponding to a right speaker Rf, a third channel 306, here corresponding to a left surround speaker Ls, and a fourth channel 308, here corresponding to a right surround speaker Rs.

Figure 3B:
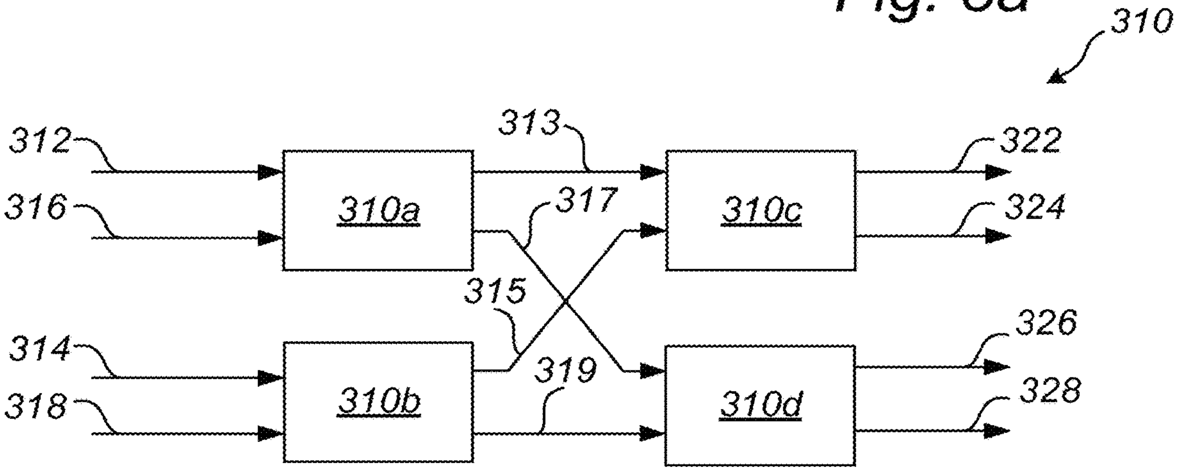
FIGS. 3*b* and 3*c* illustrate an encoding device and a decoding device, respectively, for a four-channel setup according to an exemplary embodiment.
Figure 3C:
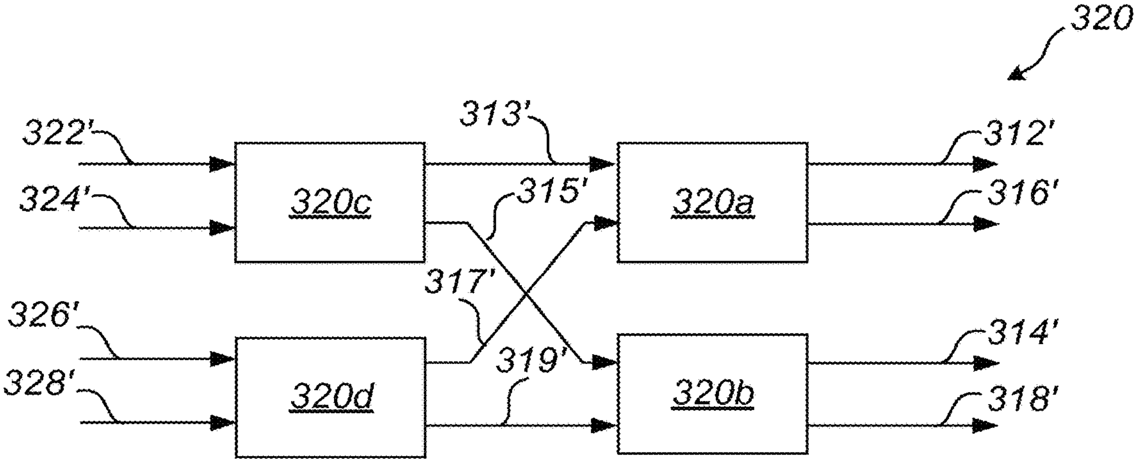

FIGS. 3*b* and 3*c* illustrate an encoding device 310 and a decoding device 320, respectively, which may be used to encode/decode the four channels 302, 304, 306, and 308 of FIG. 3*a*.

The encoding device 310 comprises a first stereo encoding component 310*a*, a second stereo encoding component 310*b*, a third stereo encoding component 310*c*, and a fourth stereo encoding component 310*d*. The operation of the encoding device 310 will now be explained.

The encoding device 310 receives a first pair of input channels. The first pair of input channels comprises a first input channel 312 (which e.g. may correspond to the Lf channel 302 of FIG. 3*a*) and a second input channel 316 (which e.g. may correspond to the Ls channel 306 of FIG. 3*a*). The encoding device 310 further receives a second pair of input channels. The second pair of input channels comprises a first input channel 314 (which e.g. may correspond to the Rf channel 304 of FIG. 3*a*) and a second input channel 318 (which e.g. may correspond to the Rs channel 308 of FIG. 3*a*). The first and second pair of input channels 312, 316, 314, 318 are typically represented in the form of MDCT spectra.

The first pair of input channels 312, 316 is input to the first stereo encoding component 310*a* which subjects the first pair of input channels 312, 316 to stereo encoding according to any of the previously described stereo coding schemes. The first stereo encoding component 310*a* outputs a first pair of intermediate output channels comprising a first channel 313 and a second channel 317. By way of example, if MS-coding or enhanced MS-coding is applied, the first channel 313 may correspond to a mid-signal and the second channel 317 may correspond to a modified side-signal.

Similarly, the second pair of input channels 314, 318 is input to the second stereo encoding component 310*b* which subjects the second pair of input channels 314, 318 to stereo encoding according to any of the previously described stereo coding schemes. The second stereo encoding component 310*b* outputs a second pair of intermediate output channels comprising a first channel 315 and a second channel 319. By way of example, if MS-coding or enhanced MS-coding is applied, the first channel 315 may correspond to a mid-signal and the second channel 319 may correspond to a modified side-signal.

Considering the channel setup of FIG. 3*a*, the processing applied by the first stereo encoding component 310*a* may correspond to performing joint stereo coding 303 of the Lf channel 302 and the Ls channel 306. Likewise, the processing applied by the second stereo encoding component 310*b* may correspond to performing joint stereo coding 305 of the Rf channel 304 and the Rs channel 308.

The first channel 313 of the first pair of intermediate output channels and the first channel 315 of the second pair of intermediate output channels are then input to the third stereo encoding component 310*c*. The third stereo encoding component 310*c* subjects the channels 313 and 315 to stereo encoding according to any of the above stereo coding schemes. The third stereo encoding component 310*c* outputs a first pair of output channels consisting of a first output channel 322 and a second output channel 324.

Similarly, the second channel 317 of the first pair of intermediate output channels and the second channel 319 of the second pair of intermediate output channels are input to the fourth stereo encoding component 310*d*. The fourth stereo encoding component 310*d* subjects the channels 317 and 319 to stereo encoding according to any of the above stereo coding schemes. The fourth stereo encoding component 310*d* outputs a second pair of output channels consisting of a first output channel 326 and a second output channel 328.

Again considering the channel setup of FIG. 3*a*, the processing carried out by the third and fourth stereo encoding components 310*c* and 310*d* may be resembled as a joint stereo coding 307 of the left and the right side of the channel setup. By way of example, if the first channels 313 and 315 of the first and second pair of intermediate output channels, respectively, are mid-signals, the third stereo encoding component 310*c* performs a joint stereo coding of the mid-signals. Likewise, if the second channels 317 and 319 of the first and second pair of intermediate output channels, respectively, are (modified) side-signals, the third stereo encoding component 310*c* performs a joint stereo coding of the (modified) side-signals. According to exemplary embodiments, the (modified) side-signals 317 and 319 may be set to zero for higher frequency ranges (with a required energy compensation for the mid-signals 313 and 315), such as for frequencies above a certain frequency threshold. By way of example, the frequency threshold may be 10 kHz.

The encoding device 310 quantizes and codes the output signals 322, 324, 326, 328 to generate a bit stream which is sent to a decoding device.

Now referring to FIG. 3*c*, the corresponding decoding device 320 is illustrated. The decoding device 320 comprises a first stereo decoding component 320*c*, a second stereo decoding component 320*d*, a third stereo decoding component 320*a* and a fourth stereo decoding component 320*b*. The operation of the decoding device 320 will now be explained.

The decoding device 320 receives, decodes and dequantizes a bit stream which is received from the encoding device 310. In this way, the decoding device 320 receives a first pair of input channels consisting of a first channel 322' (corresponding to the output channel 322 of FIG. 3*b*) and a second channel 324' (corresponding to the output channel 324 of FIG. 3*b*). The encoding device 320 further receives a second pair of input channels consisting of a first channel 326' (corresponding to the output channel 326 of FIG. 3*b*) and a second channel 328' (corresponding to the output channel 328 of FIG. 3*b*). The first and second pair of input channels are typically in the form of MDCT spectra.

The first pair of input channels 322', 324' is input to the first stereo decoding component 320*c* where it is subjected to stereo decoding according to a stereo coding scheme which is the inverse of the stereo coding scheme applied by the third stereo encoding component 310*c* at the encoder side. The first stereo decoding component 320*c* outputs a first pair of intermediate channels consisting of a first channel 313' and a second channel 315'.

In an analogous fashion the second pair of input channels 326', 328' is input to the second stereo decoding component 320*d* which applies a stereo coding scheme which is the inverse of the stereo coding scheme applied by the fourth stereo encoding component 310*d* at the encoder side. The second stereo decoding component 320*d* outputs a second pair of intermediate channels consisting of a first channel 317' and a second channel 319'.

The first channels 313' and 317' of the first and second pairs of intermediate output channels are then input to the third stereo decoding component 320*a* which applies a stereo coding scheme which is the inverse of the stereo coding scheme applied at the first stereo encoding component 310*a* at the encoder side. The third stereo decoding component 320*a* thereby generates a first pair of output channels comprising an output channel 312' (corresponding to the input channel 312 at the encoder side) and an output channel 316' (corresponding to the input channel 316 at the encoder side).

In a similar fashion the second channels 315' and 319' of the first and second pairs of intermediate output channels are input to the fourth stereo decoding component 320*b* which applies a stereo coding scheme which is the inverse of the stereo coding scheme applied at the second stereo encoding component 310*b* at the encoder side. In this way, the third stereo decoding component 320*a* generates a second pair of output channels comprising an output channel 312' (corresponding to the input channel 312 at the encoder side) and an output channel 316' (corresponding to the input channel 316 at the encoder side).

In the examples given above, the first input channel 312 corresponds to the Lf channel 302, the second input channel 316 corresponds to the Ls channel 306, the third input channel 314 corresponds to the Rf channel 304, and the fourth channel corresponds to the Rs channel 308. However, any permutation of the channels 302, 304, 306, and 308 of FIG. 3*a* with respect to the input channels 312, 314, 316, and 318 of FIG. 3*b* is equally possible. In this way the encoding/decoding devices 310 and 320 constitute a flexible framework for selecting which channels to encode pair wise and in which order. The selection may for instance be based on considerations relating to similarities between the channels.

Additional flexibility is added since the coding schemes applied by the stereo encoding components 310*a*, 310*b*, 310*c*, 310*d* may be selected. The coding schemes are preferably chosen such that the total amount of data to be transmitted from the encoder to the decoder is minimized. The choice of coding schemes to be used by the different stereo decoding components 320*a-d* on the decoder side may be signaled to the decoder device 320 by the encoder device 310 as side information (cf. items 115, 115' of FIGS. 1*b-c*). The stereo conversion components 310*a*, 310*b*, 310*c*, 310*d* may thus apply different stereo coding schemes. However, in some embodiments all stereo conversion components 310*a*, 310*b*, 310*c*, 310*d* apply the same stereo conversion scheme, for instance the enhanced MS-coding scheme.

The stereo encoding components 310*a*, 310*b*, 310*c*, 310*d* may further apply different stereo coding schemes for different frequency bands. Moreover, different stereo coding schemes may be applied for different time frames.

As discussed above, the stereo encoding/decoding components 310*a-d* and 320*a-d* 20 operate in a critically sampled MDCT domain. The choice of window will be restricted by the stereo coding schemes that are applied. In more detail, if a stereo encoding component 310*a-d* applies a MS-coding or enhanced MS-coding, its input signals need to be coded using the same window, both with respect to window shape and transform length. Thus, in some embodiments all of the input signals 312, 314, 316, and 318 are coded using the same window.

Figure 4A:
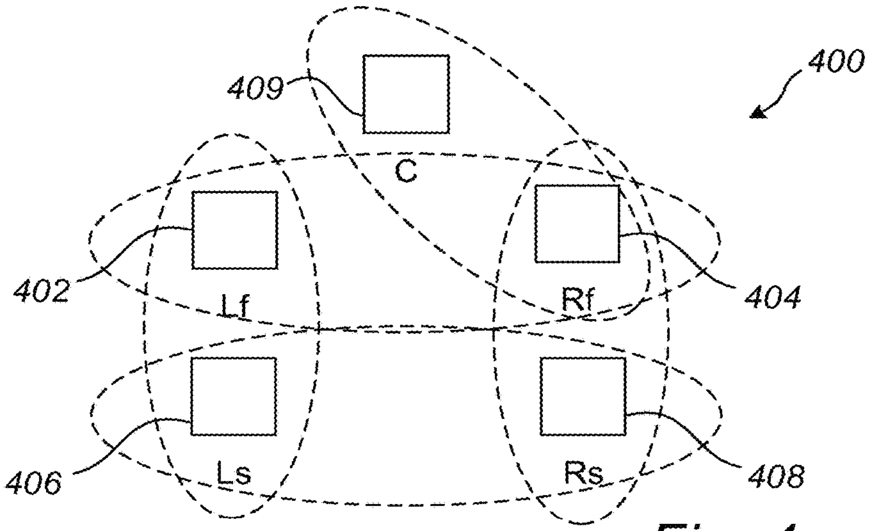
FIG. 4*a* illustrates an exemplary five-channel setup.

An exemplary embodiment will now be described with reference to FIGS. 4*a-c*. FIG. 4*a* illustrates a five-channel setup 400 of an audio system. Similar to the four-channel setup 300 discussed with reference to FIG. 3*a*, the five channel setup comprises a first channel 402, a second channel 404, a third channel 406, and a fourth channel 408, here corresponding to a Lf speaker, Rf speaker, Ls speaker and Rs speaker, respectively. In addition, the five channel setup 400 comprises a fifth channel 409 corresponding to a center speaker C.

Figure 4B:
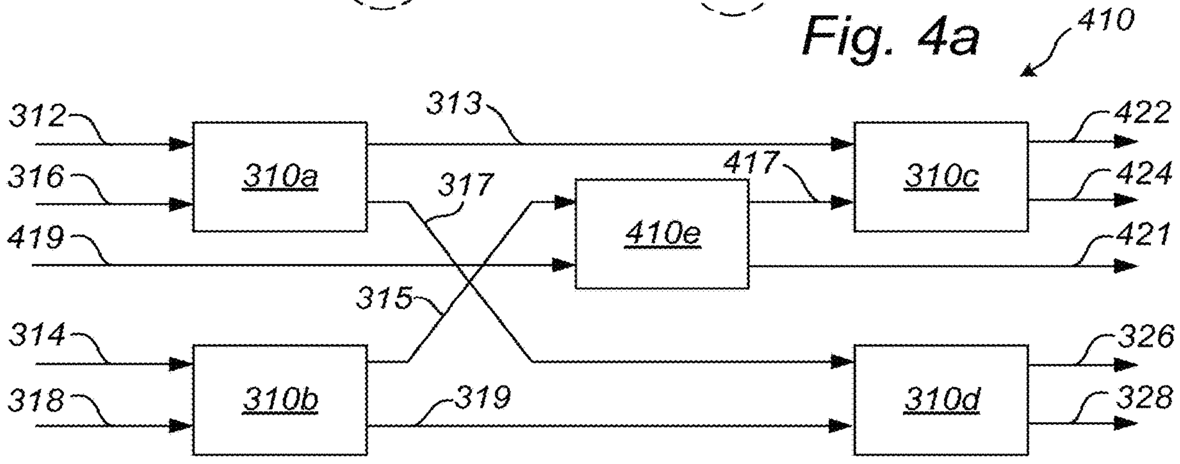
FIGS. 4*b* and 4*c* illustrate an encoding device and a decoding device, respectively, for a five-channel setup according to an exemplary embodiment.

FIG. 4*b* illustrates an encoding device 410 which e.g. may be used to encode the five channels of the five-channel setup of FIG. 4*a*. The encoding device 410 of FIG. 4*b* differs from the encoding device 310 of FIG. 3*a* in that it further comprises a fifth stereo encoding component 410*e*. Further, during operation, the encoding device 410 receives a fifth input channel 419 (which e.g. may correspond to the center channel 409 of FIG. 4*a*). The fifth input channel 419 and the first channel 317 of the second pair of intermediate output channels are input to the fifth stereo encoding component 410*e* which carries out stereo encoding in accordance with any of the above disclosed stereo coding schemes. The fifth stereo encoding component 410*e* outputs a third pair of intermediate output channels consisting of a first channel 417 and a second channel 421. The first channel 417 of the third pair of intermediate output channels and the first channel 313 of the first pair of intermediate channels are then input to the third stereo encoding component 310*c* in order to generate a first pair of output channels 422, 424. The encoder device 410 outputs five output channels, viz. the first pair of output channels 422, 424, the second channel 421 of the third intermediate pair of output channels being output of the fifth stereo encoding component 410*e*, and a second pair of output channels 326, 328 being the output of the fourth stereo encoding component 310*d*.

The output channels 422, 424, 421, 326, 328 are quantized and coded in order to generate a bit stream to be transmitted to a corresponding decoding device.

Considering the five-channel setup of FIG. 4*a* and mapping the Lf channel 402 on the input channel 312, the Ls channel 406 on the input channel 316, the C channel on the input channel 419, the Rf channel on the input channel 314, and the Rs channel on the input channel 318, the following implementation is obtained: Firstly the first and second stereo encoding components 310*a* and 310*b* performs a joint stereo coding of the Lf and Ls channel, and the Rf and Rs channel, respectively. Secondly, the fifth stereo encoding component 410*e* performs joint stereo coding of the center channel C with the result of the joint coding of the Rf and Rs channels. Thirdly, the third and fourth stereo encoding components 310*c* and 310*d* performs joint stereo coding between the left and the right side of the channel-setup 400. According to one example, if the stereo encoding components 310*a* and 310*b* are set to pass-through, i.e. to apply LR-coding, the encoding device 410 encodes the three front channels C, Lf, Rf jointly and the two surround channels Ls and Rs will be coded jointly. However, as discussed in connection to the previous embodiments, the mapping of the five channels in the channel-setup 400 onto the input channels 312, 314, 316, 318, 419 may be performed according to any permutation. For example, the center channel 409 may be jointly coded with the left side of the channel-setup instead of the right side of the channel-setup. Further it is to be noted that if the fifth stereo encoding component 410*e* performs LR-coding, i.e. a pass-through of its input signals, the encoding device 410 performs joint coding of the input channels 312, 314, 316, 318 similar to the encoding device 310, and separate coding of the input channel 419.

Figure 4C:
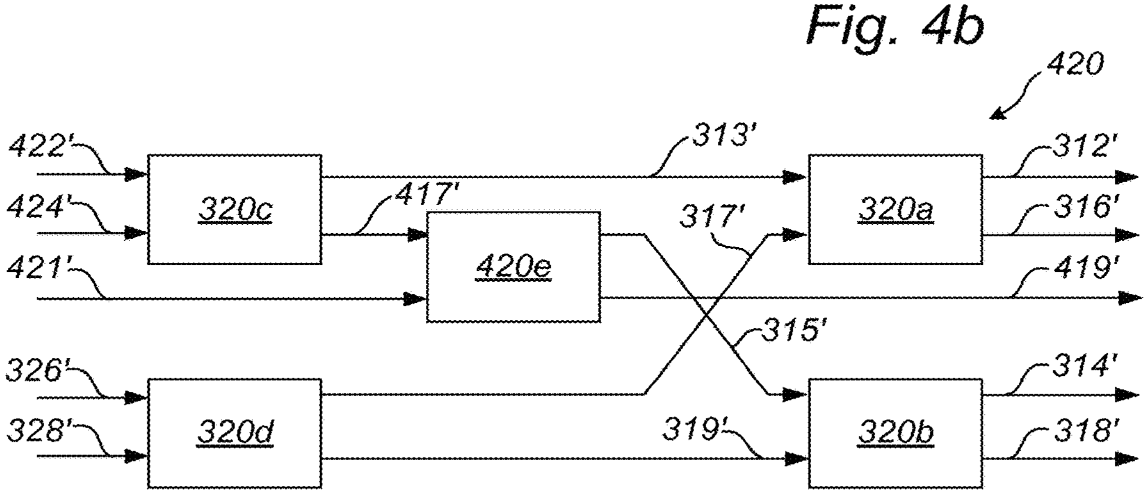

FIG. 4*c* illustrates a decoding device 420 which correspond to the encoding device 410. In comparison to the decoding device 320 of FIG. 3*c*, the decoding device 420 comprises a fifth stereo decoding component 420*e*. In addition to the first pair of input channels 422', 424' and the second pair of input channels 326', 328', the decoding device 420 receives a fifth input channel 421' which corresponds to output channel 421 on the encoder side. After having subjected the first pair of input channels 422', 424' to stereo decoding in the first stereo decoding component 320*a*, a second output channel 417' of the first stereo decoding component 320*a* and the fifth input channel 421 are input to the fifth stereo decoding component 420*e*. The fifth stereo decoding component 420*e* applies a stereo coding scheme which is the inverse of the stereo coding scheme applied by the fifth stereo encoding component 410*e* on the encoder side. The fifth stereo decoding component 420*e* outputs a third pair of intermediate output channels consisting of a first channel 315' and a second channel 419'. The first channel 315' is then, together with the second channel 319' of the second pair of intermediate output channels, input to the fourth stereo decoding component 320*d*. The decoding device 420 outputs the output channels 312', 316' of the third stereo decoding component 320*c*, the second channel 419' of the third pair of intermediate output channels, and the output channels 314', 318' of the fourth stereo decoding component 320*d*.

In the above, the concept of intermediate output channels has been used to explain how the stereo encoding/decoding components may be combined or arranged relative to each other. However, as further discussed above, an intermediate output channel merely refers to a result of a stereo encoding or stereo decoding. In particular, an intermediate output channel is typically not a physical signal in the sense that it necessarily is generated or can be measured in a practical implementation. Examples of implementations which are based on matrix operations will now be explained.

The encoding/decoding schemes described with reference to FIGS. 3*a-c* (four-channel case) and FIGS. 4*a-c* (five-channel case) may be implemented by means of performing matrix operations. For example, the first decoding component 320*c* may be associated with a first 2×2 matrix A1, the second decoding component 320*d* may be associated with a second 2×2 matrix B1, the third decoding component 320*a* may be associated with a third 2×2 matrix A2, the fourth decoding component 320*b* may be associated with a fourth 2×2 matrix B2, and the fifth decoding component 420*e* may be associated with a fifth 2×2 matrix A. The corresponding encoding components 310*a*, 310*b*, 410*e*, 310*c*, 310*d* may in a similar manner be associated with 2×2 matrices which are the inverses of the corresponding matrices on the decoder side. In a general case the matrices are defined as follows:

$$A_1 = \begin{bmatrix} A_1^{11} & A_1^{12} \\ A_1^{21} & A_1^{22} \end{bmatrix},\ A_2 = \begin{bmatrix} A_2^{11} & A_2^{12} \\ A_2^{21} & A_2^{22} \end{bmatrix},\ B_1 = \begin{bmatrix} B_1^{11} & B_1^{12} \\ B_1^{21} & B_1^{22} \end{bmatrix},$$

$$B_2 = \begin{bmatrix} B_2^{11} & B_2^{12} \\ B_2^{21} & B_2^{22} \end{bmatrix},\ A = \begin{bmatrix} A^{11} & A^{12} \\ A^{21} & A^{22} \end{bmatrix}.$$

The entries of the above matrices depend on the coding scheme (LR-coding, MS-coding, enhanced MS-coding) applied. For example, for LR-coding the corresponding 2×2 matrix equals the identity matrix, i.e.

$$\begin{bmatrix} Ln \\ Rn \end{bmatrix} = \begin{bmatrix} 1 & 0 \\ 0 & 1 \end{bmatrix} \begin{bmatrix} An \\ Bn \end{bmatrix}.$$

For MS-coding the corresponding 2×2 matrix follows from:

$$\begin{bmatrix} Ln \\ Rn \end{bmatrix} = \begin{bmatrix} 1 & 1 \\ 1 & -1 \end{bmatrix} \begin{bmatrix} An \\ Bn \end{bmatrix}.$$

For the enchanced MS-coding the corresponding 2×2 follows from:

$$\begin{bmatrix} Ln \\ Rn \end{bmatrix} = \begin{bmatrix} 1+\alpha & 1 \\ 1-\alpha & -1 \end{bmatrix} \begin{bmatrix} An \\ Bn \end{bmatrix}.$$

The coding scheme to be applied is signaled from the encoder to the decoder as side information.

A number of different examples will now be disclosed. For the purposes of these examples, the channels 312, 312' are identified with the Lf channel 402, the channels 316, 316' are identified with the Ls channel 406, the channel 419 is identified with the C channel 409, the channels 314, 314' are identified with the Rf channel 404, and the channel 318, 318' are identified with the Rs channel 408. Moreover the channels 422', 424', 421', 326' and 328' will be denoted by x1, x2, x3, x4, and x5, respectively.

Example 1: Joint Coding of Four Channels and Separate Coding of Center Channel

According to this example, the Lf, Ls, Rf, and Rs channels are jointly coded and the C channel is separately coded. For an illustration of such a coding configuration see e.g. FIG. 6*d*. In order to code the Lf, Ls, Rf, and Rs channels jointly, the MDCT spectra representing these channels should be coded with a common window with respect to window shape and transform length.

In order to achieve a separate coding of the center channel the decoding component 420*e* is set to pass-through (LR-coding) which implies that the matrix A is equal to the identity matrix.

The Lf, Ls, Rf, and Rs channels may be jointly decoded according to the following matrix operation:

$$\begin{bmatrix} Lf \\ Ls \\ Rf \\ Rs \end{bmatrix} = M \begin{bmatrix} x_1 \\ x_2 \\ x_4 \\ x_5 \end{bmatrix}, \text{ with } M = \begin{bmatrix} A_2^{11} A_1^{11} & A_2^{11} A_1^{12} & A_2^{12} B_1^{11} & A_2^{12} B_1^{12} \\ A_2^{21} A_1^{11} & A_2^{21} A_1^{12} & A_2^{22} B_1^{11} & A_2^{22} B_1^{12} \\ B_2^{11} A_1^{21} & B_2^{11} A_1^{22} & B_2^{12} B_2^{21} & B_2^{12} B_2^{22} \\ B_2^{21} A_1^{21} & B_2^{21} A_1^{22} & B_2^{22} B_1^{21} & B_2^{22} B_1^{22} \end{bmatrix}.$$

Example 2: Pairwise Coding of Four Channels and Separate Coding of Center Channel According to this example, the Lf and Ls channels are jointly coded. Moreover, the Rf, and Rs channels are jointly coded (separately from the Rf and Rs channels) and the C channel is separately coded. For an illustration of such a coding configuration see e.g. FIG. 6*b*. (The case of FIG. 6*a* may be achieved by permutation of the channels.)

In order to achieve a separate coding of the center channel the decoding component 420*e* is set to pass-through (LR-coding) which implies that the matrix A equals the identity matrix.

Further, in order to achieve a separate coding of the Lf/Ls and Rf/Rs, the decoding components 320*c*, 320*d* are set to pass-through (LR-coding) which implies that the matrices A1 and B1 equals the identity matrix. Moreover, the MDCT spectra representing the Lf and Ls channels should be coded with a common window with respect to window shape and transform length. Also, the MDCT spectra representing the Rf and Rs channels should be coded with a common window with respect to window shape and transform length. However the window for the Lf/Ls may differ from the window for Rf/Rs. The Lf, Ls, Rf, and Rs channels may be decoded according to the following matrix operations:

$$\begin{bmatrix} Lf \\ Ls \end{bmatrix} = A_2 \begin{bmatrix} x_1 \\ x_4 \end{bmatrix}, \begin{bmatrix} Rf \\ Rs \end{bmatrix} = B_2 \begin{bmatrix} x_2 \\ x_5 \end{bmatrix}$$

Example 3: Joint Coding of Five Channels

According to this example, the Lf, Ls, Rf, Rs, and C channels are jointly coded. For an illustration of such a coding configuration see e.g. FIG. 6*e*. In order to code the Lf, Ls, Rf, Rs and C channels jointly, the MDCT spectra representing these channels should be coded with a common window with respect to window shape and transform length. The Lf, Ls, Rf, and Rs channels may be decoded according to the following matrix operation:

$$\begin{bmatrix} Lf \\ Ls \\ C \\ Rf \\ Rs \end{bmatrix} = M \begin{bmatrix} x_1 \\ x_2 \\ x_3 \\ x_4 \\ x_5 \end{bmatrix},$$

where M is defined by the matrices A1, B1, A, A2, B2 along similar lines as the matrix M of Example 1 above.

Example 4: Joint Coding of Front Channels and Joint Coding of Surround Channels

According to this example, the C, Lf, and Rf channels are jointly coded and the Rs, Ls channels are jointly coded. For an illustration of such a coding configuration see e.g. FIG. 6*c*. In order to code the C, Lf, and Rf channels jointly, the MDCT spectra representing these channels should be coded with a common window with respect to window shape and transform length. Also, the MDCT spectra representing the Rs and Ls channels should be coded with a common window with respect to window shape and transform length. However the window for the C/Lf/Rf may differ from the window for Rs/Ls.

In order to achieve separate coding of the front channels and the surround channels the matrices A2 and B2 should be set to the identity matrix.

The front channels may be decoded according to $$\begin{bmatrix} C \\ Lf \\ Rf \end{bmatrix} = M \begin{bmatrix} x_1 \\ x_2 \\ x_3 \end{bmatrix},$$

where M is defined by A1 and A. The surround channels may be decoded according to $$\begin{bmatrix} Ls \\ Rs \end{bmatrix} = B_1 \begin{bmatrix} x_4 \\ x_5 \end{bmatrix}.$$

In some cases the encoding devices 310 and 410 may set the second pair of output channels 326, 328 to zero above a certain frequency, herein referred to as a first frequency (with a required energy compensation for the first pair or output channels 322, 324 or 422, 424). The reason for that is to decrease the amount of data sent from the encoding device 310, 410 to the corresponding decoding device 320, 420. In such cases, the second pair of input channels 326', 328' at the decoder side will be equal to zero for frequency bands above the first frequency. This implies that the second pair of intermediate channels 317', 319' also has no spectral content above the first frequency. According to exemplary embodiments, the second pair of input channels 326', 328' has the interpretation of being (modified) side-signals. The above described situation thus implies that for frequencies above the first frequency there are no (modified) side-signals input to the third and fourth decoding components 320*a*, 320*b*.

Figure 7:
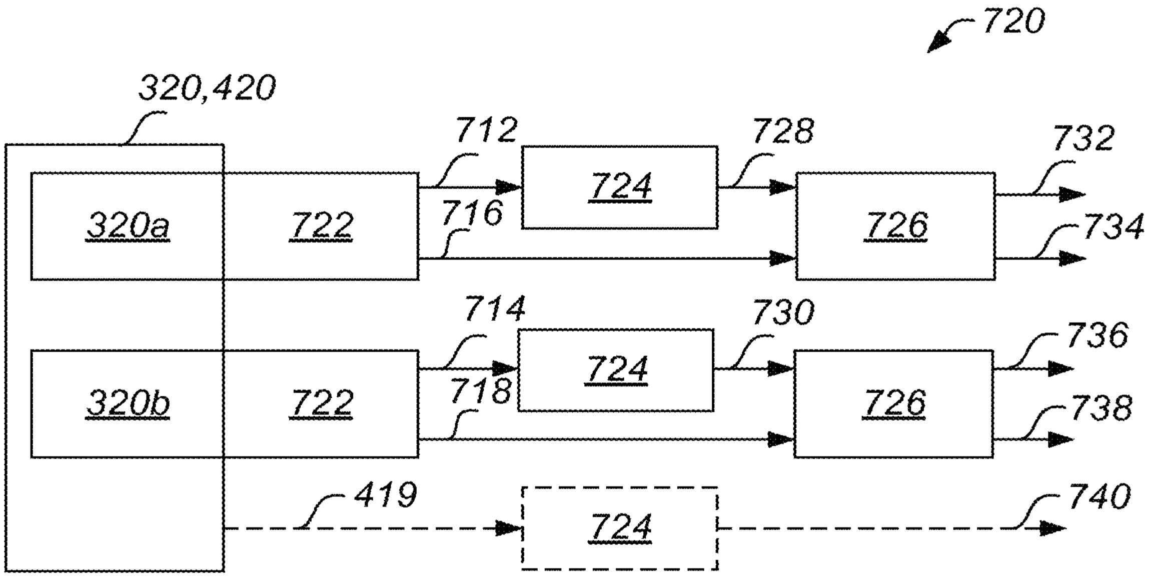
FIG. 7 illustrates a decoding device according to embodiments.

FIG. 7 illustrates a decoding device 720 which is variant of the decoding devices 320 and 420. The decoding device 720 compensates for the limited spectral content of the second pair of input channels 326', 328' of FIGS. 3*c* and 4*c*. In particular it is assumed that the second pair of input channels 326', 328' has a spectral content corresponding to frequency bands up to a first frequency and the first pair of input channels 322', 324' (or 422', 424') has a spectral content corresponding to frequency bands up to a second frequency which is larger than the first frequency.

The decoding device 720 comprises a first decoding component corresponding to any one of the decoding devices 320 or 420. The decoding device 720 further comprises a representation component 722 which is configured to represent the first pair of output channels 312', 316' as a first sum signal 712 and a first difference signal 716. More particularly, for frequency bands below the first frequency the representation component 722 transforms the first pair of output channels 312', 316' of FIG. 3*c* or FIG. 4*c* from a left-right format to a mid-side format in accordance to the expressions that have been described above. For frequency bands above the first frequency, the representation component 722 maps the spectral content of the channel 313' of FIG. 3*c* or FIG. 4*c* to the first sum signal (and the first difference signal is equal to zero for frequency bands above the first frequency).

Similarly, the representation component 722 represents the second pair of output channels 314', 318' as a second sum signal 714 and a second difference signal 718. More particularly, for frequency bands below the first frequency the representation component 722 transforms the second pair of output channels 314, 318 of FIG. 3*c* or FIG. 4*c* from a left-right format to a mid-side format in accordance to the expressions that have been described above. For frequency bands above the first frequency, the representation component 722 maps the spectral content of the channel 315' of FIG. 3*c* or FIG. 4*c* to the second sum signal (and the second difference signal is equal to zero for frequency bands above the first frequency).

The decoding device 720 further comprises a frequency extending component 724. The frequency extending component 724 is configured to extend the first sum signal and the second sum signal to a frequency range above the second frequency threshold by performing high frequency reconstruction. The frequency extended first and second sum-signals are denoted by 728 and 730. For example, the frequency extending component 724 may apply spectral band replication techniques to extend the first and second sum-signals to higher frequencies (see e.g. EP1285436B1).

The decoding device 720 further comprises a mixing component 726. The mixing component 726 performs mixing of the frequency extended sum signal 728 and the first difference signal 716. For frequencies below the first frequency the mixing comprises performing an inverse sum-and-difference transformation of the frequency extended first sum and the first difference signal. As a result, the output channels 732, 734 of the mixing component 726 equals the first pair of output channels 312', 316' of FIGS. 3*c* and 4*c* for frequency bands below the first frequency.

For frequencies above the first frequency threshold the mixing comprises performing parametric upmixing (from one signal to two signals 732, 734) of the portion of the frequency extended first sum signal corresponding to frequency bands above the first frequency threshold. Applicable parametric upmixing procedures are described for example in EP1410687B1). The parametric upmixing may include generating a decorrelated version of the frequency extended first sum signal 728 which is then mixed with the frequency extended first sum signal 728 in accordance with parameters (extracted at the encoder side) which are input to the mixing component 726. Thus, for frequencies above the first frequency, the output channels 732, 734 of the mixing component 726 correspond to an upmix of the frequency extended first sum signal 728.

In a similar manner, the mixing component processes the frequency extended second sum signal 730 and the second difference signal 718.

In case of a five-channel system (when the decoding device 720 comprises a decoding device 420), the frequency extending component 724 may subject the fifth output channel 419 to frequency extension to generate a frequency extended fifth output channel 740.

The acts of extending the first sum signal 712 and the second sum signal 714 to a frequency range above the second frequency, mixing the first sum signal 728 and the first difference signal 716, and mixing the second sum signal 730 and the second difference signal 718 are typically performed in a quadrature minor filter, QMF, domain. Therefore the decoding device 720 may comprise a QMF transforming component which transforms the sum and difference signals 712, 716, 714, 718 (and the fifth output channel 419) to a QMF domain prior to performing the frequency extension and the mixing. Moreover, the decoding device 720 may comprise an inverse QMF transforming component which transforms the output signals 732, 734, 736, 738 (and 740) to the time domain.

Figure 5A:
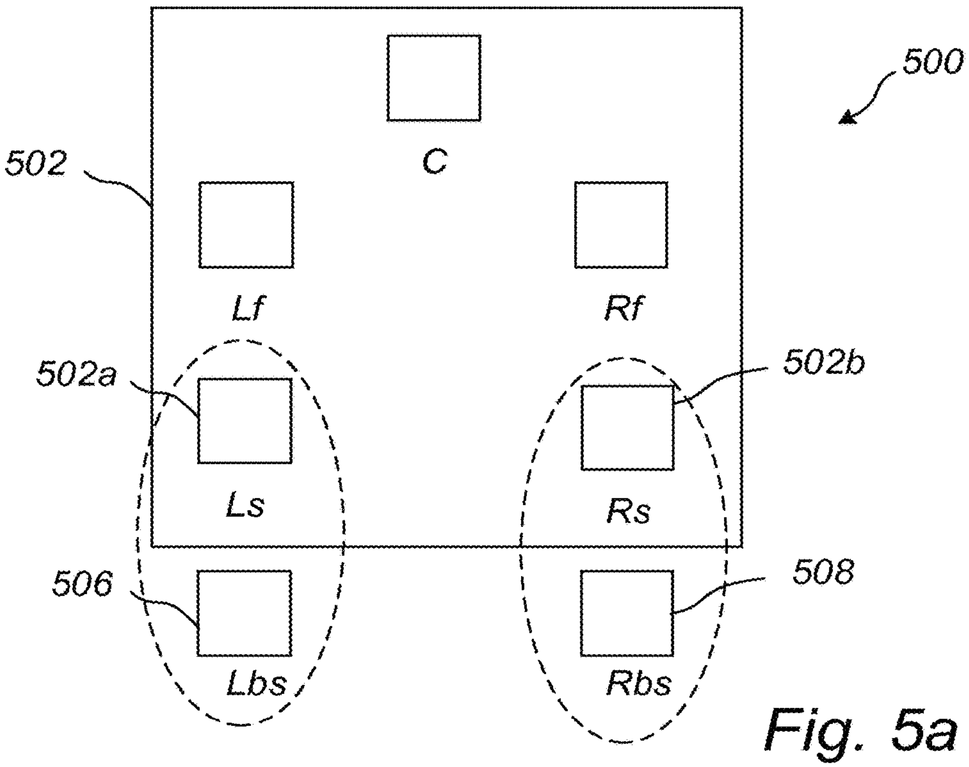
FIG. 5*a* illustrates an exemplary multi-channel setup.
Figure 5B:
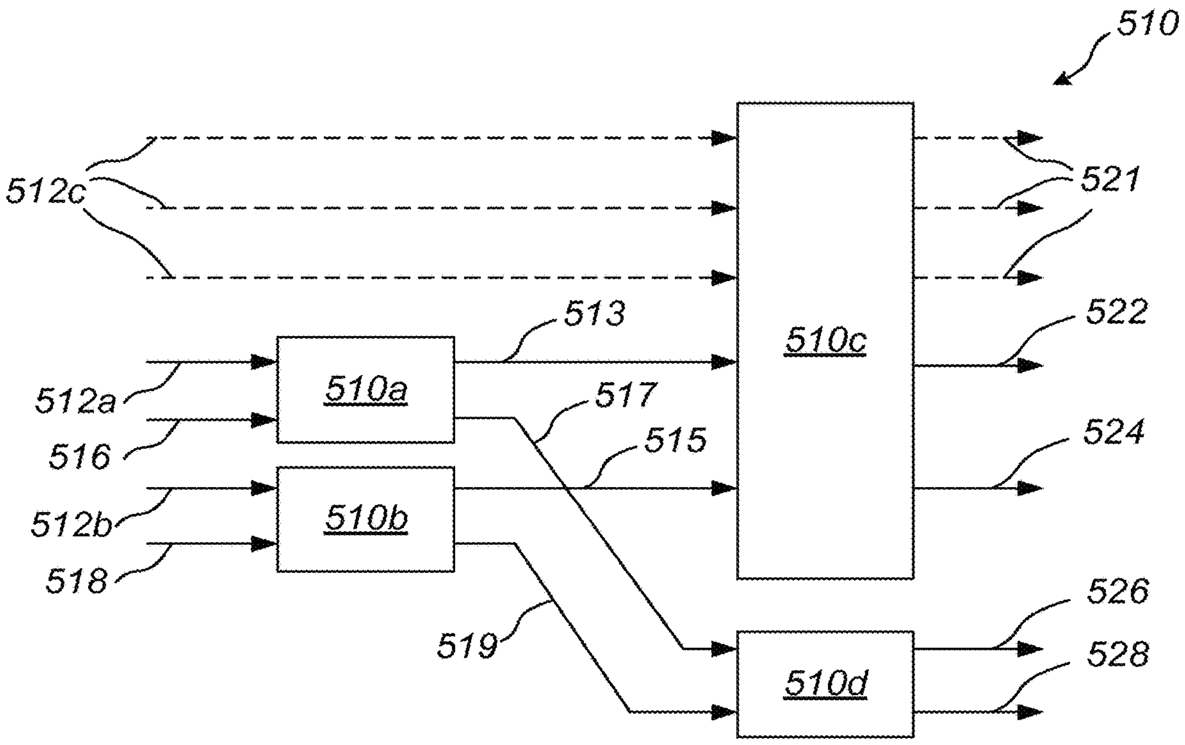
FIGS. 5*b* and 5*c* illustrate an encoding device and a decoding device, respectively, for a multi-channel setup according to an exemplary embodiment.
Figure 5C:
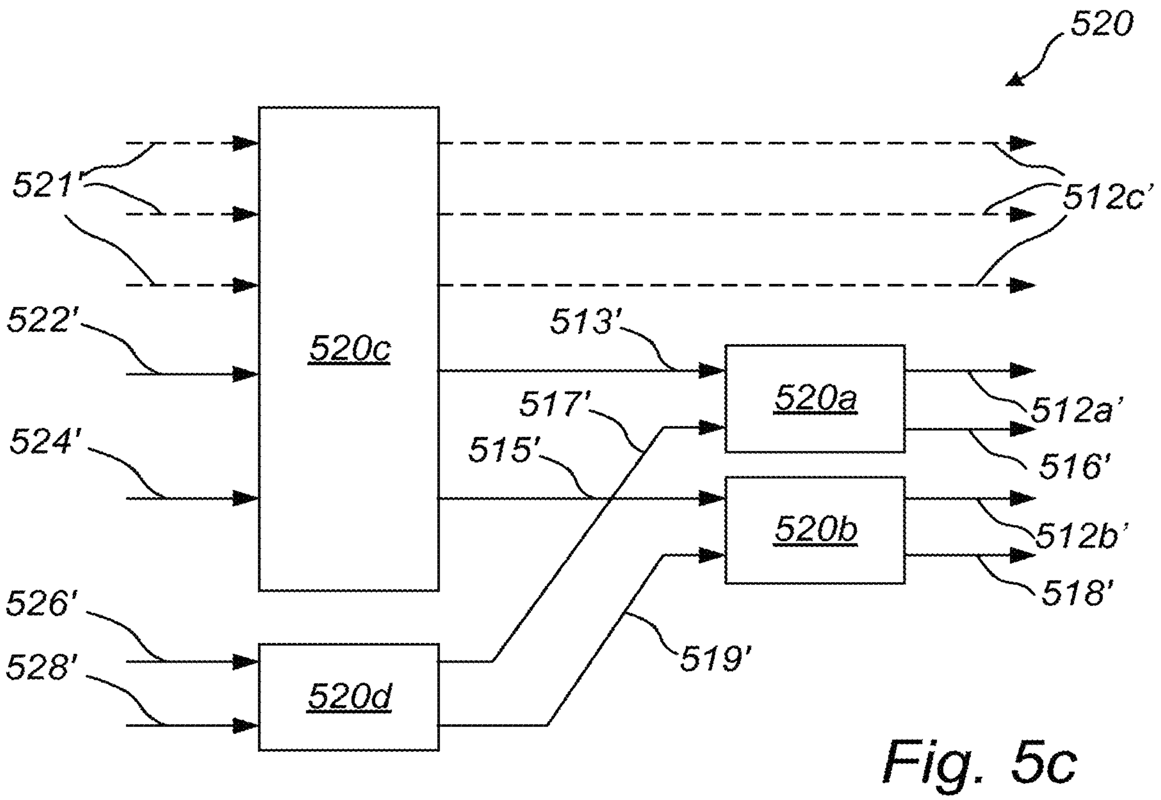

FIGS. 5*a*, 5*b* and 5*c* illustrate how additional channel pairs may be included into the encoding/decoding framework described with respect to FIGS. 1*a-c*, FIGS. 2*a-c*, FIGS. 3*a-c* and FIGS. 4*a-c*. FIG. 5*a* illustrates a multichannel setup 500 which comprises a first channel setup 502 and two additional channels 506 and 508. The first channel setup 502 comprises at least two channels 502*a* and 502*b* and may e.g. correspond to any of the channel setups illustrated in FIGS. 1*a*, 2*a*, 3*a*, and 4*a*. In the illustrated example the first channel setup 502 comprises five channels and thus corresponds to the channel setup of FIG. 4*a*. In the illustrated example, the two additional channels 506, 508 may e.g. correspond to a left back surround speaker Lbs and a right back surround speaker Rbs.

FIG. 5*b* illustrates an encoding device 510 which may be used to encode the channel setup 500.

The encoding device 510 comprises a first encoding component, 510*a*, a second encoding component 510*b*, a third encoding component 510*c*, and a fourth encoding component 510*d*. The first 510*a*, the second 510*b*, and the fourth 510*d* encoding components are stereo encoding components such as the one illustrated in FIG. 1*b*.

The third encoding component 510*c* is configured to receive at least two input channels and convert them to the same number of output channels. For example, the third encoding component 510*c* may correspond to any of the encoding devices 110, 210, 310, 410 of FIGS. 1*b*, 2*b*, 3*b*, and 4*b*. However, more generally, the third encoding component 510*c* may be any encoding component which is configured to receive at least two input channels and convert them to the same number of output channels.

The encoding device 510 receives a first number of input channels corresponding to the number of channels of the first channel setup 502. In accordance to the above, the first number is thus at least equal to two and the first number of input channels includes a first input channel 512*a*, and a second input channel 512*b* (and possibly also some remaining channels 512*c*). In the illustrated example, the first and second input channels 512*a*, 512*b* may correspond to channels 502*a*, and 502*b* of FIG. 5*a*.

The encoding device 510 further receives two additional input channels, a first additional input channel 516 and a second additional input channel 518. The input channels 512*a-c*, 516, 518 are typically represented as MDCT spectra.

The first input channel 512*a* and the first additional channel 516 are input to the first stereo encoding component 510*a*. The first stereo encoding component 510*a* performs stereo encoding according to any of the stereo coding schemes disclosed above. The first stereo encoding component 510*a* outputs a first pair of intermediate output channels including a first channel 513 and a second channel 517.

Similarly, the second input channel 512*b* and the second additional channel 518 are input to the second stereo encoding component 510*b*. The second stereo encoding component 510*b* performs stereo encoding according to any of the stereo coding schemes disclosed above. The second stereo encoding component 510*a* outputs a second pair of intermediate output channels including a first channel 515 and a second channel 519.

Considering the example channel setup 500 of FIG. 5*a*, the processing carried out by the first and second stereo encoding components 510*a*, 510*b* corresponds to stereo coding of the Lbs channel 506 with the Ls channel 502*a*, and stereo coding of the Rbs channel 508 and Rs channel 502*b*, respectively. However, it is to be understood that with other exemplary channel setups other interpretations are obtained.

The first channel 513 of the first pair of intermediate output channels and the first channel 515 of the second pair of intermediate output channels are then input to the third encoding component 510*c* together with the first number of input channels 512*c* apart from the first input channel 512*a* and the second input channel 512*b*. The third encoding component 510*c* converts its input channels 513, 515, 512*c* to generate the same amount of output channels, including a first pair of output channels 522, 524, and, if applicable further output channels 521. The third encoding component may e.g. convert its input channels 513, 515, 512*c* analogously to what have been disclosed with respect to FIG. 1*b*, FIG. 2*b*, FIG. 3*b*, and FIG. 4*b*.

Similarly, the second channel 517 of the first pair of intermediate output channels and the second channel 519 of the second pair of intermediate output channels are input to the fourth stereo encoding component 510*d* which performs stereo encoding according to any of the stereo coding schemes discussed above. The fourth stereo encoding component outputs a second pair of output channels 526, 528.

The output channels 521, 522, 524, 526, 528 are quantized and coded to form a bit stream to be transmitted to a corresponding decoding device.

FIG. 5*c* illustrates a corresponding decoding device 520. The decoding device 520 comprises a first decoding component, 520*c*, a second decoding component 520*d*, a third decoding component 520*a*, and a fourth decoding component 520*b*. The second 520*d*, the third 520*a*, and the fourth 520*b* decoding components are stereo decoding components such as the one illustrated in FIG. 1*c*.

The first decoding component 520*a* is configured to receive at least two input channels and convert them to the same number of output channels. For example, the first decoding component 520*c* could correspond to any of the decoding devices 120, 220, 320, 420 of FIGS. 1*b*, 2*b*, 3*b*, and 4*b*. However, more generally, the first decoding component 520*c* may be any decoding component which is configured to receive at least two input channels and convert them to the same number of output channels.

The decoding device 520 receives, decodes and dequantizes a bit stream transmitted by the encoding device 510. In this way, the decoding device 520 receives a first number of input channels 521', 522', 524' corresponding to output channels 521, 522, 524 of the encoding device 510. In accordance to the above, the first number of input channels includes a first input channel 522', and a second input channel 524' (and possibly also some remaining channels 521').

The decoding device 520 further receives two additional input channels, a first additional input channel 526' and a second additional input channel 528' (corresponding to output channels 526, 528 on the encoder side).

The first number of input channels 521', 522', 524' is input to the first decoding component 520*c*. The first decoding component 520*c* converts its input channels 521', 522', 524' to generate the same amount of output channels, including a first pair of intermediate output channels 513', 515', and, if applicable further output channels 512*c'*. The first decoding component 520*c* may e.g. convert its input channels 521', 522', 524' analogously to what have been disclosed with respect to FIG. 1*c*, FIG. 2*c*, FIG. 3*c*, and FIG. 4*c*. In particular, the first decoding component 520*c* is configured to perform a decoding which is the inverse of the encoding carried out by the third encoding component 510*c* on the encoder side.

The first additional input channel 526, and the second additional input channel 528 are input to the second stereo decoding component 520*d* which performs stereo decoding corresponding to the inverse of the encoding carried out by the fourth stereo encoding component 510*d* on the encoder side. The second stereo decoding component 520*d* outputs a second pair of intermediate output channels 517', 519'.

The first channel 513' of the first pair of intermediate output channels and the first channel 517' of the second pair of intermediate output channels are input to the third stereo decoding component 520*a*. The third stereo decoding component 520*a* performs stereo decoding corresponding to the inverse of the encoding carried out by the first stereo encoding component 510*a* on the encoder side. The third stereo decoding component 520*a* outputs a first pair of output channels including a first channel 512*a'* and a second channel 516'.

Similarly, the second channel 515' of the first pair of intermediate output channels and the second channel 519' of the second pair of intermediate output channels are input to the fourth stereo decoding component 520*b*. The fourth stereo decoding component 520*b* performs stereo decoding corresponding to the inverse of the encoding carried out by the second stereo encoding component 510*b* on the encoder side. The fourth stereo decoding component 520*a* outputs a second pair of output channels including a first channel 512*b'* and a second channel 518'.

FIGS. 6*a*, 6*b*, 6*c*, 6*d* and 6*d* illustrate the five channels of a five-channel system. The five channels may be divided into different groups to form different coding configurations. Each group corresponds to channels that are jointly encoded by using encoding devices in accordance to the above.

Figure 6A:
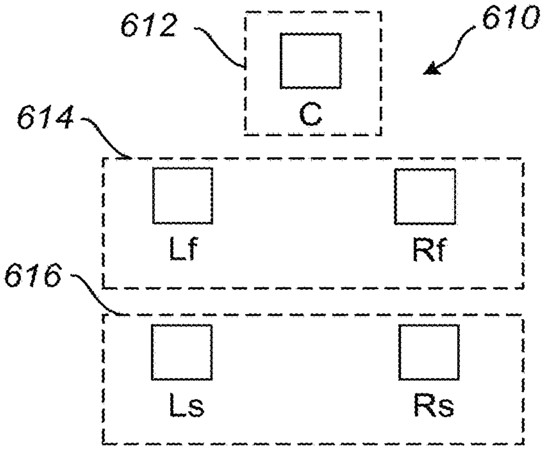
FIGS. 6*a*, 6*b*, 6*c*, 6*d* and 6*e* illustrate coding configurations of a five-channel audio system according to an example.
Figure 6B:
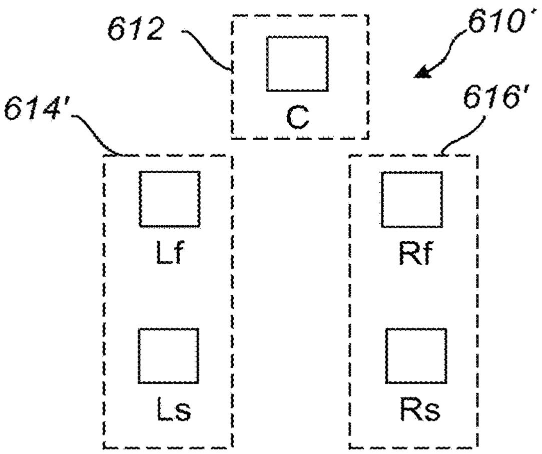

A first coding configuration 610 is shown in FIG. 6*a*. The first coding configuration 610 comprises a first group 612 which consists of one channel (here the center channel C), a second group 614 consisting of two channels (here the Lf and the Rf channels), and a third group 616 consisting of two channels (here the Ls and the Rs channels). The channel of the first group 612 will be separately coded, the channels of the second group 614 will be jointly coded, and the channels of the third group 616 will be jointly coded. Such encoding could e.g. be achieved by the encoding device 410 of FIG. 4*b* by mapping the Lf channel on input channel 312, the Ls channel on input channel 316, the C channel on the input channel 419, the Rf channel on the input channel 314, and the Rs channel on the input channel 318. Further, the coding schemes of the first 310*a*, second, 310*b*, and fifth 410*d* stereo encoding components should be set to LR-coding (pass-through of input signals). FIG. 6*b* illustrates a variant 610' of the first coding configuration 610. In the variant 610' of the first coding configuration the second group 614' corresponds to the Lf and Ls channels and the third group 616' to the Rf and Rs channels. The coding configurations of FIGS. 6*a* and 6*b* are in the following referred to as 1-2-2 coding configurations.

Figure 6C:
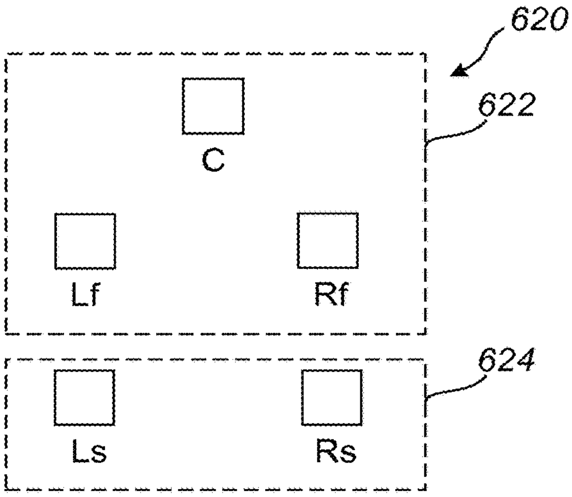

A second coding configuration 620 is shown in FIG. 6*c*. The second coding configuration 620 comprises a first group 622 which consists of three channels (here the center channel C, the Lf channel, and the Rf channel), and a second group 624 consisting of two channels (here the Ls and the Rs channels). The coding configuration of FIG. 6*c* is in the following referred to as a 2-3 coding configuration. The channels of the first group 622 will be jointly coded and the channels of the second group 624 will be jointly coded separate from the first group 622. Such encoding could e.g. be achieved by the encoding device 410 of FIG. 4*b* by mapping the Lf channel on input channel 312, the Ls channel on input channel 316, the C channel on the input channel 419, the Rf channel on the input channel 314, and the Rs channel on the input channel 318. Further, the coding schemes of the first 310*a*, second, 310*b* stereo encoding components should be set to LR-coding (pass-through of input signals).

Figure 6D:
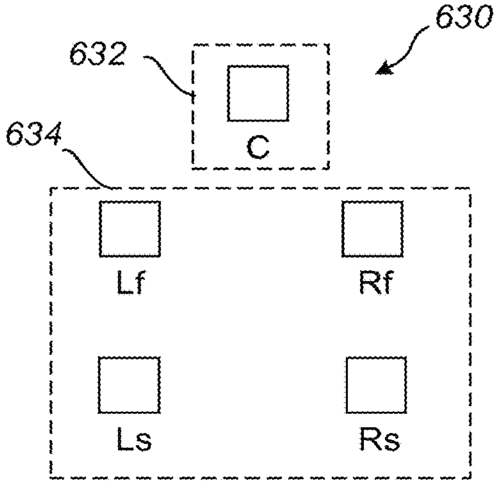

A third coding configuration 630 is shown in FIG. 6*d*. The third coding configuration 620 comprises a first group 632 which consists of one channel (here the center channel C), and a second group 634 consisting of four channels (here the Ls and the Rs channels). The coding configuration of FIG. 6*d* is in the following referred to as a 1-4 coding configuration. The channel of the first group 632 will be separately coded and the channels of the second group 634 will be jointly coded. Such encoding could e.g. be achieved by the encoding device 410 of FIG. 4*b* by mapping the Lf channel on input channel 312, the Ls channel on input channel 316, the C channel on the input channel 419, the Rf channel on the input channel 314, and the Rs channel on the input channel 318. Further, the coding schemes of the fifth stereo encoding component 410*d* should be set to LR-coding (pass-through of input signals).

Figure 6E:
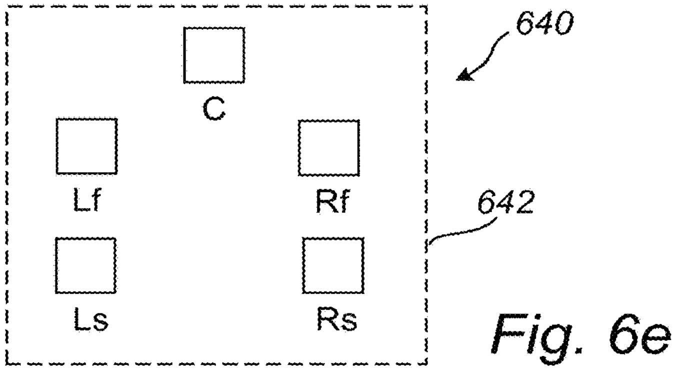

A fourth coding configuration 640 is shown in FIG. 6*e*. The fourth coding configuration 640 comprises a single group 642 which consists of all five channels, meaning that all channels are jointly coded. The coding configuration of FIG. 6*d* is in the following referred to as a 0-5 coding configuration. For example, the channels may be jointly encoded by the encoding device 410 of FIG. 4*b* by mapping the Lf channel on input channel 312, the Ls channel on input channel 316, the C channel on the input channel 419, the Rf channel on the input channel 314, and the Rs channel on the input channel 318.

Although the above coding configurations have been explained with respect to a five-channel system, it is equally applicable to systems having four of more channels.

The encoding device may thus code the audio content of the multi-channel system according to different coding configurations 610, 610', 620, 630, 640. The coding configuration used at the encoder side has to be communicated to the decoder. For this purpose a particular signaling format may be used. For an audio system comprising at least four channels, the signaling format comprises at least two bits which indicate one of the plurality of configurations 610, 610', 620, 630, 640 to be applied at the decoder side. For example, each coding configuration may be associated with an identification number and the at least two bits may indicate the identification number of the coding configuration to apply in the decoder.

For the five channel system illustrated in FIGS. 6*a*-6*e*, two bits may be used to select between a 1-2-2 configuration, a 2-3 configuration, a 1-4 or a 0-5 configuration. In cased the two bits indicate a 1-2-2 configuration, the signaling format may comprise a third bit indicating which variant of the 1-2-2 configuration to select, i.e. whether the left-right coding configuration of FIG. 6*a* or the front-back configuration of FIG. 6*b* is to be applied. The following pseudo-code gives an example of how this could be implemented:

```
switch (high_mid_coding_config){
case 1_2_2_coding:
  1_2_2_channel_mapping /* 0=Lf/Rf, Ls/Rs; 1=Lf/Ls + Rf/Rs */
  two_channel_data( ); /* Lf/Rf or Lf/Ls */
  two_channel_data( ); /* Ls/Rs or Rf/Rs */
  mono_data( ) /* C */
  break;
case 3ch_joint_coding:
  three_channel_data( ) /* L/R/C */
  two_channel_data( ) /* Ls/Rs */
  break;
case 4ch_joint_coding:
  four_channel_data( ) /* L/R/Ls/Rs */
  mono_data( ) /* C */
  break;
case 5ch_joint_coding:
  five_channel_data( )
  break;
}
```

With respect to the above pseudo-code, the signaling format uses two bits to code the parameter high_mid_coding_config, and one bit is used to code the parameter 1_2_channel_mapping.

Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for decoding a bit stream comprising M input audio channels, wherein M is at least 3, the method comprising:

extracting side information from the bit stream;

stereo decoding a first pair of audio channels based on the side information, from the M input audio channels; so as to obtain two stereo decoded audio channels, wherein the two stereo decoded audio channels combined with M−2 of the input audio channels not included in the first pair of audio channels form a first set of M audio channels; and stereo decoding a second pair of audio channels so as to obtain two additional stereo decoded audio channels, wherein the two additional stereo decoded audio channels, together with the M−2 of the audio channels, form a second set of M audio channels.

2. A computer program product comprising a non-transitory computer-readable medium with instructions for performing a method in accordance with claim 1.

3. An apparatus for decoding a bit stream comprising M input audio channels, wherein M is at least 3, the apparatus comprising:

an extractor for extracting side information from the bit stream;

a stereo decoder configured to stereo decode a first pair of audio channels based on the side information, from the M input audio channels; so as to obtain two stereo decoded audio channels, wherein the two stereo decoded audio channels combined with M−2 of the input audio channels not included in the first pair of audio channels form a first set of M audio channels, the stereo decoder further configured to stereo decode a second pair of audio channels so as to obtain two additional stereo decoded audio channels, wherein the two additional stereo decoded audio channels, together with the M−2 of the audio channels, form a second set of M audio channels.

* * * * *